US012598223B2

(12) United States Patent
Karnas

(10) Patent No.: US 12,598,223 B2
(45) Date of Patent: Apr. 7, 2026

(54) DYNAMIC TELECONFERENCE CONTENT ITEM DISTRIBUTION TO MULTIPLE DEVICES ASSOCIATED WITH A USER

(71) Applicant: Google LLC, Mountain View, CA (US)

(72) Inventor: Adam James Karnas, San Diego, CA (US)

(73) Assignee: GOOGLE LLC, Mountain View, CA (US)

( * ) Notice: Subject to any disclaimer, the term of this patent is extended or adjusted under 35 U.S.C. 154(b) by 249 days.

(21) Appl. No.: 18/472,974

(22) Filed: Sep. 22, 2023

(65) Prior Publication Data

US 2025/0106268 A1 Mar. 27, 2025

(51) Int. Cl.
*H04L 65/403* (2022.01)

(52) U.S. Cl.
CPC ................................. *H04L 65/403* (2013.01)

(58) Field of Classification Search
CPC ...................................................... H04L 65/403
USPC ...................................................... 348/14.07
See application file for complete search history.

(56) References Cited

U.S. PATENT DOCUMENTS

| | | | | |
|---|---|---|---|---|
| 9,323,455 B2 * | 4/2016 | Jeong | .................. | G06F 3/04886 |
| 11,943,267 B1 * | 3/2024 | Nelson | .................. | H04L 65/403 |
| 2021/0044645 A1 * | 2/2021 | Jayaweera | .......... | H04L 12/1822 |
| 2022/0391158 A1 * | 12/2022 | Lemmens | ............. | G06F 3/1446 |
| 2024/0053879 A1 * | 2/2024 | Wang | ........................ | G09G 5/14 |
| 2025/0310474 A1 * | 10/2025 | Jin | ........................... | H04N 7/15 |
| 2025/0310479 A1 * | 10/2025 | Jin | ........................ | G06F 3/1454 |

* cited by examiner

*Primary Examiner* — Binh Kien Tieu

(74) *Attorney, Agent, or Firm* — DORITY & MANNING P.A.

(57) ABSTRACT

A session join request to join an active teleconference session is provided to a teleconference computing system that hosts the active teleconference session. The session join request can include information that identifies a first participant associated with the first computing device. Responsive to providing the session join request to join the active teleconference session, interface display information is received from the teleconference computing system. The interface display information can include information indicating that a second computing device associated with the first participant is already connected to the active teleconference session. The interface display information can include instructions to display a first candidate content item of a plurality of candidate content items. Display of either the first video stream or the second video stream within an interface associated with the active teleconference session is caused.

18 Claims, 8 Drawing Sheets

_200

PROVIDING A REQUEST TO JOIN AN ACTIVE TELECONFERENCE SESSION TO A TELECONFERENCE COMPUTING SYSTEM THAT HOSTS THE ACTIVE TELECONFERENCE SESSION, WHEREIN THE REQUEST COMPRISES INFORMATION THAT IDENTIFIES A FIRST PARTICIPANT ASSOCIATED WITH THE FIRST PARTICIPANT COMPUTING DEVICE — 205

RECEIVING, FROM THE TELECONFERENCE COMPUTING SYSTEM, INTERFACE DISPLAY INFORMATION COMPRISING INFORMATION INDICATING THAT A SECOND PARTICIPANT COMPUTING DEVICE ASSOCIATED WITH THE FIRST PARTICIPANT IS ALREADY CONNECTED TO THE ACTIVE TELECONFERENCE SESSION, AND INSTRUCTIONS TO DISPLAY A FIRST CANDIDATE CONTENT ITEM OF A PLURALITY OF CANDIDATE CONTENT ITEMS — 210

CAUSING, BY THE FIRST PARTICIPANT COMPUTING DEVICE, DISPLAY OF EITHER THE FIRST VIDEO STREAM OR THE SECOND VIDEO STREAM WITHIN AN INTERFACE ASSOCIATED WITH THE ACTIVE TELECONFERENCE SESSION — 206

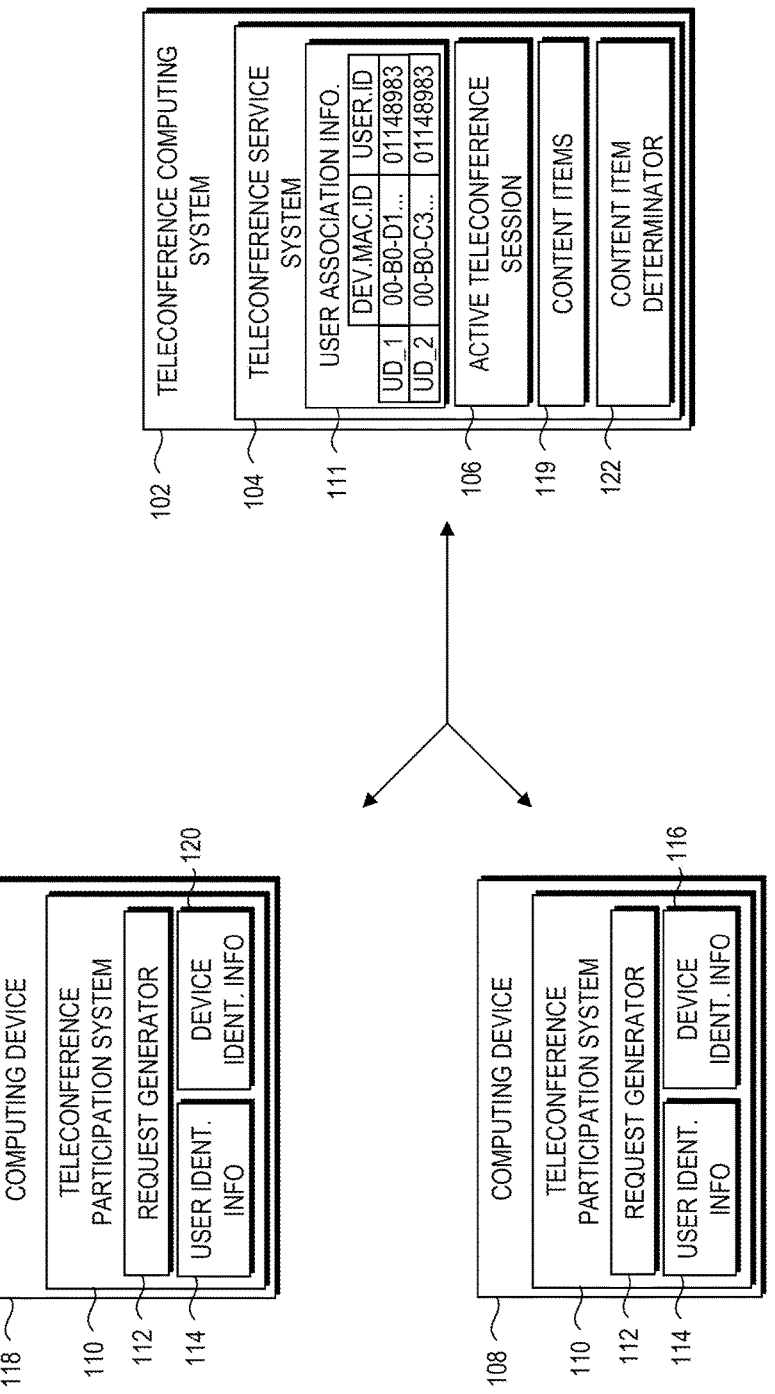
Figure 1

Figure 2:
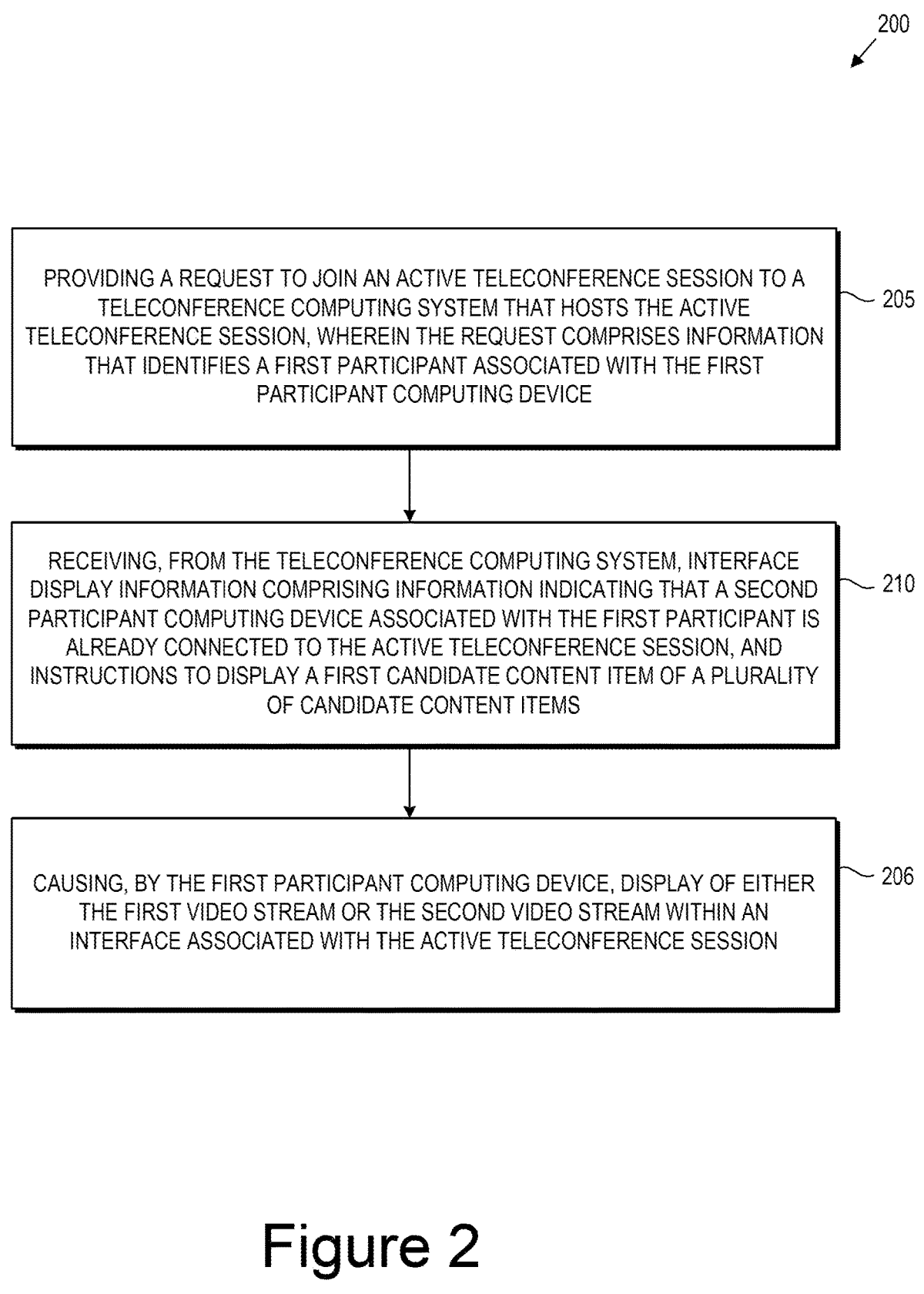

200

PROVIDING A REQUEST TO JOIN AN ACTIVE TELECONFERENCE SESSION TO A TELECONFERENCE COMPUTING SYSTEM THAT HOSTS THE ACTIVE TELECONFERENCE SESSION, WHEREIN THE REQUEST COMPRISES INFORMATION THAT IDENTIFIES A FIRST PARTICIPANT ASSOCIATED WITH THE FIRST PARTICIPANT COMPUTING DEVICE

205

RECEIVING, FROM THE TELECONFERENCE COMPUTING SYSTEM, INTERFACE DISPLAY INFORMATION COMPRISING INFORMATION INDICATING THAT A SECOND PARTICIPANT COMPUTING DEVICE ASSOCIATED WITH THE FIRST PARTICIPANT IS ALREADY CONNECTED TO THE ACTIVE TELECONFERENCE SESSION, AND INSTRUCTIONS TO DISPLAY A FIRST CANDIDATE CONTENT ITEM OF A PLURALITY OF CANDIDATE CONTENT ITEMS

210

CAUSING, BY THE FIRST PARTICIPANT COMPUTING DEVICE, DISPLAY OF EITHER THE FIRST VIDEO STREAM OR THE SECOND VIDEO STREAM WITHIN AN INTERFACE ASSOCIATED WITH THE ACTIVE TELECONFERENCE SESSION

DYNAMIC TELECONFERENCE CONTENT ITEM DISTRIBUTION TO MULTIPLE DEVICES ASSOCIATED WITH A USER

FIELD

The present disclosure relates generally to synchronizing teleconference content items across multiple computing devices.

BACKGROUND

Conventionally, laptop or desktop computers with dedicated capture devices (e.g., microphones, webcams, etc.) have been required to participate in teleconferencing sessions. However, the rapid development of increasingly compact and capable devices has led to many teleconference participants possessing multiple devices that are individually capable of facilitating teleconference participation. For example, the average teleconference participant may have access to a smartphone, wearable device, tablet, laptop, and even Mixed Reality (XR) device—each of which can include the technology necessary to facilitate participation in a teleconference (e.g., capture devices, output devices, a display device, etc.).

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes providing, by a first computing device comprising one or more processor devices, a session join request indicative of a request to join an active teleconference session to a teleconference computing system that hosts the active teleconference session, wherein the session join request comprises information that identifies a first participant associated with the first computing device. The method includes, responsive to providing the session join request to join the active teleconference session, receiving, by the first computing device from the teleconference computing system, interface display information comprising information indicating that a second computing device associated with the first participant is already connected to the active teleconference session, and instructions to display a first content item of a plurality of content items, wherein the plurality of content items comprises one or more content items currently being displayed by the second computing device. The method includes causing, by the first computing device, display of the first content item within an interface associated with the active teleconference session.

Another example aspect of the present disclosure is directed to a computing system that includes one or more processor devices and one or more tangible, non-transitory computer-readable media that store instructions that, when executed by the one or more processor devices, cause the one or more processor devices to perform operations. The operations include receiving, from a first computing device, a session join request indicative of a request to join an active teleconference session hosted by the computing system. The operations include making a determination that the first computing device and a second computing device that is currently connected to the active teleconference session are both associated with a first participant of the active teleconference session. The operations include, based on the determination, providing interface display information to the first computing device, wherein the interface display information comprises instructions to display a first candidate content item of a plurality of candidate content items, wherein the plurality of candidate content items comprise one or more content items being displayed at the second computing device.

Another example aspect of the present disclosure is directed to a first computing device that includes one or more processor devices and one or more tangible, non-transitory computer-readable media that store instructions that, when executed by the one or more processor devices, cause the one or more processor devices to perform operations. The operations include providing a session join request indicative of a request to join an active teleconference session to a teleconference computing system that hosts the active teleconference session, wherein the session join request comprises information that identifies a first participant associated with the first computing device. The operations include, responsive to providing the session join request to join the active teleconference session, making a determination that a second computing device that is currently connected to the active teleconference session is also associated with the first participant. The operations include, based on the determination, exchanging messages with the second computing device, wherein the messages comprise information descriptive of one or more first content items currently being displayed at the second computing device and one or more second content items currently not being displayed at the second computing device. The operations include, based on the messages, causing display of either (a) at least one of the one or more first content items, or (b) at least one of the one or more second content items.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 1 is a block diagram of an example computing environment that dynamically distributes content items over devices associated with the same user according to some implementations of the present disclosure.

FIG. 2 is a flow diagram of an example method for dynamically distributing teleconference content items to devices associated with the same user, in accordance with some embodiments of the present disclosure.

Figure 3:
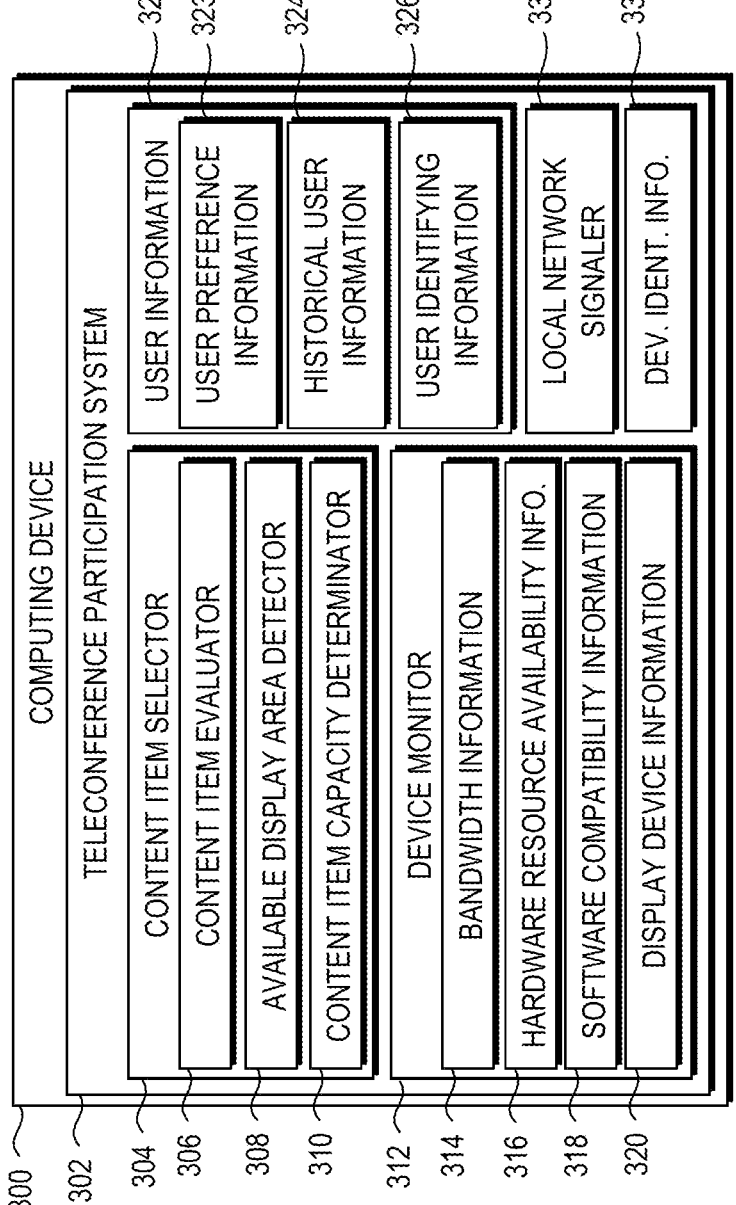
FIG. 3 is a block diagram of an example computing device for display of dynamically distributed content items according to some implementations of the present disclosure.

Reference numerals that are repeated across plural figures are intended to identify the same features in various implementations.

DETAILED DESCRIPTION

Generally, the present disclosure is directed to dynamically distributing teleconference content items over multiple devices associated with the same user. More specifically, in recent years, teleconferencing services have developed the capability to host large videoconferencing sessions between dozens, or even hundreds, of participants. Additionally, many such services now enable collaborative participation with applications and/or various forms of media (e.g., sharing a video feed, sharing an application such as a web browser, etc.). For example, a company "town hall" videoconference meeting may have a hundred active participants exchanging video streams. During this videoconference, a presenter may share additional content to each of the participants via a content sharing feature (e.g., a slide deck, an application, etc.)

However, as teleconference services facilitate greater numbers of concurrent connections, and enable content sharing between participants, display space becomes an increasingly limited resource. Display space, as described herein, refers to the visual space of a participant's display device (e.g., monitor, smartphone display, etc.) that is available for displaying teleconference content. To follow the previous example, shared content, such as slide decks, generally requires a substantial portion of the display space available on a participant's display device. In addition, participant video streams can only be shrunk by a certain amount before the stream is too small to be perceived. As such, a participant in a larger teleconference session may only be able to view a fraction of the video streams being shared within the teleconference session.

Accordingly, implementations of the present disclosure propose dynamic teleconference content item distribution to devices associated with the same user. For example, assume that a teleconference computing system implements a teleconferencing service by hosting a videoconference session between multiple participants. Further assume that one of these participants, such as an engineer, is actively participating in the session via a laptop device, and that the laptop device lacks sufficient display space to display the video streams received from all participants. The engineer may realize that some of the video streams from other participants are not being displayed due to a lack of available display space at the laptop device. In response, the engineer can access another teleconference-capable device, such as a smartphone. This smartphone can provide a request to join the active videoconference session to the teleconference computing system. The request can include information that identifies the smartphone as belonging to the engineer. For example, the request may include the engineer's access credentials for the teleconferencing service implemented by the teleconference computing system (e.g., a username, etc.).

In response to the request, the teleconference computing system can determine that the engineer associated with the smartphone is also associated with the laptop device already being used to participate in the teleconference. For example, the teleconference computing system can determine that access credentials included in the request match the access credentials provided by the laptop device. Based on this determination, the teleconference computing system can provide interface display information to the smartphone. The interface display information can include information indicating that some other device associated with the engineer (e.g., the laptop) is already connected to the videoconference session. Additionally, the interface display information can include instructions to display one (or more) content items (e.g., shared content, video streams, etc.). The smartphone can display the content item(s) indicated by the interface display information.

In such fashion, teleconference content items that cannot be displayed at one device can be dynamically distributed to another device for display, therefore enabling the display of substantially more content items while more efficiently utilizing the multiple devices commonly owned by teleconference participants. In addition, implementations of the present disclosure also enable the dynamic duplication of content items displayed on one device to another. For example, if a participant moves away from one device while carrying the other device (e.g., to begin traversing public transportation, etc.), the teleconference computing system may dynamically switch from "extending" the display of the device (e.g., displaying content not displayed on the other device) to "duplicating" the display of the device (e.g., displaying content already being displayed on the other device). In this manner, seamless and continuous participation in a teleconference can be provided for participants.

Aspects of the present disclosure provide a number of technical effects and benefits. As one example technical effect and benefit, implementations of the present disclosure enable more efficient utilization of teleconference-capable devices belonging to a participant. For example, conventional teleconferencing techniques generally only enable participation via a single device. However, the average participant often owns multiple teleconference-capable devices which go unused while the participant participates in the teleconference. As such, by seamlessly enabling the utilization of multiple devices to act as an extended "display space," implementations of the present disclosure provide more efficient device utilization while substantially increasing the quantity of content that can be displayed to a participant.

As another example technical effect and benefit, transitioning from one device to another device while teleconferencing can cause substantial disruptions. For example, assume that an engineer participating in a videoconference session from their desktop computer device wishes to switch to a mobile device so they can continue participating while walking to catch the bus. If the videoconference session of hosted by a conventional teleconferencing service, the engineer must disconnect from the videoconference session, access a mobile device, login to the mobile device, and then re-join the videoconference session—all while walking to the bus stop. However, if content items from the video conference are being dynamically distributed to the mobile device via the techniques described herein, the engineer can simply take their mobile device and walk towards the bus. The mobile device, and/or the teleconference computing system, can determine that the engineer has moved away from the desktop computing device, and in response, can switch from "extending" the desktop computing device to "duplicating" the desktop computing device. In this manner, implementations of the present disclosure can enable a seamless transition from the desktop device to the mobile device by obviating the need to disconnect, access the device, login, re-join the session, or perform any other actions on the mobile device.

With reference now to the Figures, example implementations of the present disclosure will be discussed in further detail.

FIG. 1 is a block diagram of an example computing environment that dynamically distributes content items over devices associated with the same user according to some implementations of the present disclosure. In particular, a teleconference computing system 102 can be utilized to host teleconferencing sessions. Generally, as described herein, teleconferencing can refer to the live exchange of communication data. A teleconference may refer to a videoconference, audioconference, AR/VR conference, multimedia conference, etc. More specifically, the teleconference computing system 102 can include a teleconference service system 104. The teleconference service system 104 can host an active teleconference session 106.

Multiple computing devices can be connected to the active teleconference session 106. As described herein, a computing device can be any type or manner of computing device that can facilitate participation in a teleconference (e.g., connect to a teleconference, capture and transmit communication data, etc.). Such computing devices can include smartphones, laptops, tablets, desktop computers, peripheral computing devices (e.g., wireless earbuds, Mixed Reality (MR) devices, etc.), wearable computing devices, etc.

In some implementations, the teleconference service system 104 can maintain user account information for user accounts that are used to participate in teleconference sessions. For example, assume that a user wishes to initiate the active teleconference session 106. The teleconference service system may request the user to log in to a user account associated with the teleconference service system 104, or to register a new user account. The user can provide access credentials for the user account via a computing device associated with the user. The teleconference service system 104 can verify the received access credentials and can begin hosting the active teleconference session 106.

The computing device 108 can include a teleconference participation system 110. The teleconference participation system 110 can perform actions required to participate in teleconference sessions, such as connecting to the active teleconference session 106. For example, the teleconference participation system 110 can include a request generator 112. The request generator 112 can generate session join requests to join teleconference sessions and provide such requests to the teleconference service system 104. Additionally, the teleconference participation system 110 can handle operations related to exchanging communication data within an active teleconference, leaving a teleconference session, co-hosting a Peer-to-Peer (P2P) teleconference session in conjunction with the teleconference service system 104, etc.

The computing device 108 can be associated with a user. Generally, as used herein, a computing device can be "associated with" a user if the user previously utilized, or is currently utilizing, the device to provide information that identifies the user, such as user account credentials, a password, etc. For example, assume that the user owns, borrows, is assigned, or otherwise utilizes the computing device 108. If the user wishes to participate in the active teleconference session 106, the user can provide an input associated with joining the active teleconference session 106. In response, the teleconference participation system 110 can generate a session join request to join the active teleconference session 106 with the request generator 112. The session join request can include user identifying information 114, such as access credentials for a user account associated with the teleconference computing system 104. The teleconference computing system can verify the user identifying information 114 and allow the computing device 108 to connect to the active teleconference session 106.

The teleconference service system 104 can maintain user association information 111. The user association information 111 can store current and previous associations between user accounts and computing devices. To follow the previous example, assume that the user logs into their user account for the first time using the computing device 108. The session join request to join the active teleconference session 106 can include the user identifying information 114. The session join request can also include device identifying information 118. The device identifying information 118 can be, or otherwise include, a unique identifier for the computing device 108. The user association information 111 can store the association between the user identifying information 114 and the device identifying information 116. To follow the depicted example, the device identifying information 118 can be a unique Media Access Control (MAC) address "00-B0-C3 . . . ", and the user identifying information 114 can include a unique user identifier of "01148983". The user association information 111 can store the association between the user identifier "01148983" and the MAC address "00-B0-C3 . . . ." In such fashion, the teleconference computing system can store the association between the user and the computing device 108.

As described previously, the user can utilize the computing device 108 to actively connect to the active teleconference session 106. However, the user may also wish to utilize a computing device 118 to connect to the active teleconference 106. By connecting to the active teleconference session 106 with both the computing devices 118 and 108, content items 119 from the active teleconference session 106 can be displayed across display devices associated with both of the computing devices 118 and 108. Content items, as described herein, generally refer to discrete portions of "content" provided to the user by the teleconference service system 104 within the active teleconference session 106. The content items 119 can include video streams, audio streams, "screen share" streams, applications with shared execution environments, chat box interface elements, teleconference control elements, etc.

For example, if the active teleconference session 106 includes a large number of content items 119 (e.g., due to a large number of participants, etc.), the user may wish to increase the total quantity of available display area so that more of the content items 119 can be concurrently displayed. By connecting to the active teleconference session 106 with both the computing device 118 and the computing device

108, the content items 119 can be distributed for display across the display devices associated with both computing devices.

Prior to determining a distribution of the content items 119 across the computing devices 118 and 108, the teleconference service system 104 can determine that the computing device 118 is associated with the same user as the computing device 108. Specifically, the user can provide an input via the computing device 118, and in response, the teleconference participation system 110 can provide a session join request to the teleconference service system as described with regards to the computing device 108. The session join request can include the user identifying information 114 and device identifying information 120. The user identifying information 114 can be the same information provided with the computing device 108. The device identifying information 120 can include a unique identifier that uniquely identifies the computing device 118. The teleconference service system 104 can modify the user association information 111 to store the association between the user identifying information 114 and the device identifying information 120.

The teleconference service system 104 can determine that the computing device 118 is associated with the same user as the computing device 108 that is already connected to the active teleconference session 106. To follow the depicted example, the user association information 111 already stores the association between the device identifying information 116 (e.g., MAC address "00-B0-C3 . . . " and the user identifying information 114 (e.g., user ID 01448983). The user association information 111 can be modified to further associate the user identifying information 114 with the device identifying information 120 (e.g., MAC address "00-B0-D1"). The teleconference service system 104 can determine that the computing device 118 requesting to connect to the active teleconference session 106 is associated with the same user as the computing device 108 that is already connected to the active teleconference session 106.

Based on the determination, the teleconference service system 104 can utilize a content item determinator 122 to distribute the content items 119 between the computing device 118 and the computing device 108. More specifically, the content item determinator 122 can determine, for each of the content items 119, whether to provide the content items 119 for display at the computing device 118, the computing device 108, or both. For example, if one participant in the active teleconference session 106 is currently providing a "screen share" view, the content item determinator 122 can provide the screen share view for display at the computing device 118, while providing video streams from participants for display at the computing device 108. In such fashion, the teleconference computing system 102 can dynamically distribute the teleconference content items 119 to the computing devices 108 and 118 associated with the same user.

FIG. 2 is a flow diagram of an example method 200 for dynamically distributing teleconference content items to devices associated with the same user, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the teleconference participation system 110 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The discussion of FIG. 2 below refers to multiple computing devices. In particular, the discussion below refers to a computing device that has already connected to an active teleconference session, and another computing device that connects to the same active teleconference session. As such, to more clearly illustrate the various implementations of the present disclosure, the computing device that is already being used to actively participate in the active teleconference will be referred to as a "second" computing device, while the computing device that includes the processing logic will be referred to as a "first" computing device. However, it should be noted that the terms "first" and "second" are only used to differentiate between two computing devices, and that such terms do not imply any similarities or differences between the computing devices (or anything else).

In addition, it should be noted that the terms "duplicate" and "extend" are utilized in the following description of FIG. 2 to clearly indicate a current display "mode" for a display device, computing device, or content item. More specifically, as described herein, a "duplicate" content item generally refers to a content item that is being displayed via both the first computing device and the second computing device. As such, a computing device that only displays content items also being displayed at another computing device can be described as operating in a "duplicate" mode. Conversely, an "extended" content item generally refers to a content item that is not being displayed at another computing device due to constraints on available display area. As such, a computing device that only displays content items that are not displayed at another computing device due to a lack of available display area can be described as operating in an "extension" mode.

At operation 205, processing logic of a first computing device can provide a session join request to join an active teleconference session to a teleconference computing system that hosts the active teleconference session. As used herein, "hosting" a teleconference session generally refers to either directly hosting the teleconference session or orchestrating a P2P-hosted teleconference session. For example, if directly hosting the teleconference session, the teleconference computing system can receive communication data (e.g., audio streams, video streams, etc.) from one participant and can broadcast the received communication data to other participants in the teleconference session. For another example, if orchestrating a P2P-hosted teleconference session, the teleconference computing system can assist by relaying information between computing devices so that the computing devices can directly exchange communication data.

The session join request to join the active teleconference session can include information that identifies a participant associated with the first computing device. Participant, as described herein, refers to a user, or a virtualized user (e.g., a bot, an automated account, etc.) that is participating in a teleconference, has participated in a teleconference, intends to participate in a teleconference, etc. For example, a user that connects to an active teleconference session with a computing device can be referred to as a participant in the active teleconference session.

In some implementations, the information that identifies the first participant associated with the first computing device can be, or otherwise include, access credentials associated with the first participant. The access credentials can be used to access the active teleconference session. For example, assume the teleconference session is associated with a teleconference service provider. The teleconference service provider can require that users create and log into an account managed by the teleconference service provider before joining a teleconference. The participant can provide access credentials for a corresponding user account managed by the teleconference service provider (e.g., a username and password).

In some implementations, to provide the request to join the active teleconference session to the teleconference computing system, the processing logic can provide content selection information to the teleconference computing system. In some implementations, the content selection information can describe a current state of the first computing device that includes the processing logic. For example, the content selection information may indicate a current battery level for the first computing device, a location of the first computing device, capabilities of the first computing device (e.g., a quantity of display area available, a type of connected display device, etc.), network performance metrics for a connection available to the first computing device, etc.

Additionally, or alternatively, in some implementations, the content selection information can include content selection preferences for the first participant associated with the first computing device. The content selection preferences can indicate a preference for which type of content items are to be provided to the first computing device. For example, the content selection preferences can indicate a preference that "screen share" streams (e.g., streams that provide a view of a participant's screen or application executing on the user's computer device), applications in a shared execution environment, etc. be displayed on a separate display device. For another example, the content selection preferences can indicate a preference towards video streams from other participants being displayed on multiple display devices.

In some implementations, to provide the content selection information, the processing logic can provide the content selection information descriptive of the current state of the first computing device to the teleconference computing system. In some implementations, the content selection information can include device identifying information that identifies characteristics of the first computing device, such as device performance metrics, device identifying information, etc. Additionally, or alternatively, in some implementations, the content selection information can include display information descriptive of a display device associated with the first computing device. For example, the content selection information can describe a current resolution of the display device, current area(s) of the display device that are available, additional resolutions the display device is capable of, etc.

Additionally, or alternatively, in some implementations, the content selection information can include a current location of the first computing device. For example, the content selection information can include geolocation coordinates corresponding to the current location of the first computing device. Additionally, or alternatively, in some implementations, the content selection information can include a bandwidth capacity available to the first computing device. For example, if the first computing device can access both a Wi-Fi network and a wireless communications network (e.g., a high speed Fifth Generation (5G) New Radio (NR) network), the bandwidth capacities of both the Wi-Fi network and the wireless communications network.

At operation 210, the processing logic can receive interface display information from the teleconference computing system responsive to providing the request to join the active teleconference session. The interface display information can include information indicating that a second computing device associated with the participant is already connected to the active teleconference session. More specifically, the interface display information can indicate that the participant is already actively participating in the active teleconference session using the second computing device.

It should be noted that the interface display information does not necessarily include information explicitly indicating that the second computing device associated with the user is connected to the active teleconference session. Rather, the interface display information itself can be sufficient for the processing logic to infer, or determine, that some other computing device associated with the participant is already connected to the active teleconference session.

The interface display information can further include instructions to display a candidate content item of a plurality of candidate content items. Specifically, the first computing device that includes the processing logic can also include, or can be coupled to, one (or more) display devices. The interface display information can include instructions to display the candidate content item in the display. For example, if the first computing device is a smartphone, the interface display information can instruct the smartphone to display the content item within the display device of the smartphone.

In some implementations, the interface display information can further instruct the first computing device to display the content item in a specific manner. For example, the interface display information may instruct the first computing device to display the content item within a certain type and/or size of interface element. For another example, the interface display information may instruct the first computing device to display the content item at a certain location of the display device.

In some implementations, to receive the interface display information, the processing logic can receive the instructions to display one of multiple candidate content items. In some implementations, the candidate content items can include a video stream associated with some other participant that is already being displayed at the second computing device associated with the participant. For example, assume that the other participant is a presenter at a conference. The video stream of the presenter can be displayed at the display device associated with the second computing device. The processing logic can display the same video stream of the presenter at the display device of the first computing device. In such fashion, the video stream can be duplicated so that the video stream is displayed at the display devices of both the first computing device and the second computing device.

Additionally, or alternatively, in some implementations, the candidate content items can include a video stream associated with some other participant that is not being displayed at the other computing device. To follow the previous example, assume that a listening participant is listening to the presenter. Because the listening participant is not actively speaking, the video stream associated with the listening participant may not be displayed due to display area constraints. The processing logic can display the video stream of the listener at the display device of the first computing device, thus increasing the total number of content items displayed to the user.

Additionally, or alternatively, in some implementations, the plurality of candidate content items can include a screen-share stream associated with a third computing device. For example, an assistant participant who assists the presenter participant can provide a "screen share" stream of a slide deck. The "screen share" stream can be displayed at the display device associated with the first computing device.

Additionally, or alternatively, in some implementations, the plurality of candidate content items can include an interface of a teleconferencing application associated with the active teleconference session. For example, the teleconference participation system 110 described with regards to FIG. 1 may be, or otherwise include, a teleconferencing application executed at the computing devices. The teleconference participation system 110 can provide a user interface for the application that enables the user to control various aspects of the teleconferencing application. The user interface can be displayed at the display device associated with the first computing device. Additionally, or alternatively, in some implementations, the candidate content items can include an interface of an application other than the teleconferencing application.

In some implementations, to receive the interface display information, the processing logic can receive, from the teleconference computing system, the instructions to display a particular candidate content item. The candidate content items can include a plurality of video streams associated with participants that are not being displayed at the second computing device.

At operation 215, the processing logic can cause display of a video stream within an interface associated with the active teleconference session. In some implementations, to cause the display of either the first video stream or the second video stream, the processing logic can determine a content item display capacity based on a display area available to the interface associated with the active teleconference session. As used herein, a "content item display capacity" generally refers to a number of content items, such as video streams, that can be displayed within the available display area. Based at least in part on the content item display capacity, the processing logic can select a number of video streams being displayed at the second computing device. The processing logic can cause display of the selected video streams within the interface associated with the active teleconference session at the display device of the second computing device.

As an example, assume that the active teleconference session includes ten participants that are each providing a separate video stream. The display device associated with the second computing device can already be displaying video streams from six of the ten participants, and can lack the capacity to display any additional video streams. The first computing device can provide the session join request to the teleconference computing system to join the teleconference. In response, the teleconference computing system, or the first computing device, can determine that the content item display capacity for the second computing device is sufficient to display three content items. The first computing device can then cause three of the four remaining video streams to be displayed at the display device associated with the first computing device.

In some implementations, the processing logic can determine a reduction to the video stream display capacity based on a change in the display area available to the interface associated with the active teleconference session. Based on the change in the video stream display capacity, the processing logic can cause display of at least one of the one or more first video streams within the interface associated with the active teleconference session to cease.

To follow the previous example, assume that the first computing device successfully causes display of the three video streams at the display device associated with the first computing device. The three video streams can be displayed within an application window for the teleconference application. If the user provides an input that shrinks the application window, the content item display capacity can be reduced to a maximum capacity of two content items. If the processing logic determines that the content item display capacity has been reduced, the processing logic can cause display of the third video stream to cease.

In some implementations, the processing logic can receive information indicating that an additional first video stream is being displayed at the second computing device. The processing logic can cause display of the additional first video stream within the interface associated with the active teleconference session. For example, assume that three video streams are being displayed at the display device associated with the second computing device. Further assume that the three video streams are being duplicated and displayed at the display device associated with the second computing device. In other words, the second computing device can "duplicate" the content items displayed at the first computing device. If a fourth video stream is displayed via the first computing device, the fourth video stream can be duplicated and displayed via the second computing device.

In some implementations, the processing logic can further receive information indicating that a particular video stream is being displayed at the second computing device. The processing logic can cause display of the particular video stream within the interface associated with the active teleconference session to cease. For example, assume that the processing logic is enabling an "extension" operating mode in which the processing logic causes display of content items that cannot be displayed at the first computing device due to a lack of available display area. If the particular video stream is being displayed by the computing device as an "extended" video stream in the "extension" operating mode, then "extended" display of the particular video stream becomes redundant once the particular video stream is being displayed at the second computing device. Accordingly, the second computing device can cause display of the particular video stream within the display device to cease.

FIG. 3 is a block diagram of an example computing device for display of dynamically distributed content items according to some implementations of the present disclosure. More specifically, a computing device 300 can include a teleconference participation system 302. The computing device 300 can be any type or manner of computing device that includes a display device, or is otherwise capable of causing content items to be displayed at a display device. For example, the computing device can be a device that includes a built-in display device, such as a smartphone, laptop, smart watch, wearable device, Augmented Reality (AR)/Virtual Reality (VR) device, etc. For another example, the computing device can be a device that can directly or indirectly cause content items to be displayed on a display device, such as a desktop computer, a virtualized compute instance, a network node, a modular computer device, a Small Single-Board computer (SBC), etc.

The teleconference participation system 302 can facilitate participation in a teleconference. More specifically, the teleconference participation system 302 can perform actions that enable a user to connect to an active teleconference session, leave an active teleconference session, host a P2P teleconference session, request that a teleconference session be created, exchange communication data within an active teleconference session, capture communication data, output communication data, etc. For example, the teleconference participation system 302 can perform encoding and decoding operations for communication data. For another example, the teleconference participation system 302 can communicate with an operating system of the computing device 300 to handle input/output operations for communication data.

The teleconference participation system 302 can include a content item selector 304. The content item selector 304 can select content items for display. In some implementations, the content item selector 304 can select content items based on instructions received from a teleconference computing system. For example, the teleconference computing system can simply provide content items to the content item selector 304 and the content item selector 304 can cause the content items to be displayed.

Additionally, or alternatively, in some implementations, the teleconference computing system can provide content items to the content item selector 304 with information descriptive of the content items. The content item selector 304 can evaluate the content items with a content item evaluator 306. Specifically, the content item evaluator 306 can evaluate the content of the content items, and/or the information descriptive of the content items provided by the teleconference computing system, to select a subset of the content items for display. For example, if a content item is a video stream, the content item evaluator 306 can evaluate a frequency at which a participant associated with the video stream is assigned an "active speaker" role. An active speaker role can be assigned to a participant that is actively speaking to other participants. In other words, the content item evaluator 306 can predict a "relevance" of a content item.

The content item selector 304 can include an available display area detector 308. The available display area detector 308 can detect whether particular areas of the display device are available for displaying content items. For example, assume that the computing device 300 is displaying an application window for a teleconference application using the right-most half of the display device. Further assume that another application window is being displayed within the left-most half of the display device. If the other application window is being actively utilized (e.g., the user is entering notes into a word processing application, etc.), the available display area detector 308 can determine that the space utilized by the other application window is not available. Conversely, if the other application window is not being actively utilized (e.g., an internet browser that has not been used within the past hour, etc.), the available display area detector 308 can determine that the space utilized by the other application window is available.

The content item selector 304 can include a content item capacity determinator 310. The content item capacity determinator 310 can determine a currently available capacity for content items to be displayed. The content item capacity determinator 310 can also determine a minimum display area required for each content item. In other words, the content item capacity determinator 310 can determine a number of content items that can currently be displayed within the available display area detected with the available display area detector 308. For example, the available display area detector 308 can determine that an area of 1000×1000 is currently available at the display device associated with the computing device 300. The content item capacity determinator 310 can determine that each video stream content item requires a minimum area of 250×250 pixels. Based on the currently available area, and the minimum area required for each content item, the content item capacity determinator 310 can determine a content item capacity of four content items.

The teleconference participation system 302 can include a device monitor 312. The device monitor 312 can monitor various performance metrics, configurations, parameters, etc. of the computing device 300 and/or the teleconference participation system 302. To do so, the device monitor 312 can include bandwidth information 314. The bandwidth information 314 can describe a maximum bandwidth currently available to the computing device 300. Additionally, in some implementations, the bandwidth information 314 can indicate previous maximum bandwidths that were previously available to the computing device 300. For example, assume that the computing device 300 is connected to a wireless Wi-Fi network and a high-speed broadband wireless network. The bandwidth information 314 can indicate a maximum bandwidth available over both the wireless Wi-Fi network and the high-speed broadband network.

The device monitor 312 can include hardware resource availability information 316. The hardware resource availability information 316 can indicate a current availability of hardware resources of the computing device 300. For example, if the computing device 300 is performing a processor-intensive task in the background, such as updating an anti-virus application, the hardware resource availability information 316 can indicate that limited processor cycles are available. For another example, if the computing device 300 is running another application that is memory-intensive, such as a video game, the hardware resource availability information 316 can indicate that limited memory resources are currently available.

Additionally, in some implementations, the hardware resource availability information 316 can indicate previous hardware resource utilization. For example, the hardware resource availability information 316 can indicate that memory resource utilization of the computing device 300 is rarely less than 70%. Additionally, or alternatively, in some implementations, the hardware resource availability information 316 can indicate predicted hardware resource utilization at a subsequent time. For example, the hardware resource availability information 316 can indicate that an anti-virus update is scheduled to occur in the next hour, and as such, it is likely that processor cycles will be limited at some time in the next hour.

The device monitor 312 can include software compatibility information 318. The software compatibility information 318 can describe an operating system installed to the computing device 300, applications installed or otherwise available to the computing device 300, versioning information for the applications, etc. For example, the software compatibility information 318 may indicate that the operating system of the computing device 300 is not compatible with certain applications executed in a shared execution environment. A shared execution environment refers to multiple participants within a teleconference providing inputs to a single instance of an application. In other words, within a shared execution environment, multiple participants can control the same application.

The device monitor 312 can include display device information 320. The display device information 320 can describe various characteristics of the display devices associated with the computing device 300. Characteristics of the display device can include supported display resolutions, color reproduction capabilities, refresh rate capabilities, etc. The display device information 320 can also indicate if the display is a built-in display for another type of device, such as an AR/VR device.

The content item selector 304 can select content items based on information provided by the device monitor 312. Specifically, based on information provided to the content item selector 304 by the device monitor 312, the content selector 304 can increase, decrease, or modify the quantity and/or type of content items selected.

In some implementations, the content selector 304 can increase, decrease, or modify the quantity and/or type of content items selected based on bandwidth information 314. For example, if the bandwidth available to the computing device 300 is relatively low, the content item selector 304 can reduce the quantity of content items selected. Additionally, or alternatively, the content item selector 304 can select a particular type of content item that requires less bandwidth than other content items, such as an application executing in a shared execution environment.

Additionally, or alternatively, in some implementations, the content selector 304 can increase, decrease, or modify the quantity and/or type of content items selected based on the hardware resource availability information 316. For example, if the hardware resource availability information 316 indicates a lack of available hardware resources, the content item selector 304 may select fewer content items. Alternatively, the content item selector 304 may select content items that require fewer available hardware resources (e.g., audio streams, text chat windows, etc.).

Additionally, or alternatively, in some implementations, the content selector 304 can increase, decrease, or modify the quantity and/or type of content items selected based on the software compatibility information 318. For example, if the software compatibility information 318 indicates a lack of compatibility for particular content items, such as native applications, the content item selector 304 may select content items other than those particular content items.

Additionally, or alternatively, in some implementations, the content selector 304 can increase, decrease, or modify the quantity and/or type of content items selected based on the display device information 320. For example, if the display device information 320 indicates a relatively low resolution, or some other lack of visual fidelity, the content item selector 304 can select content items that require less visual fidelity (e.g., interface elements, etc.). Conversely, if the display device information 320 indicates a relatively high resolution, the content item selector 304 can select content items that require more visual fidelity (e.g., text chat windows, video streams, etc.).

The teleconference participation system 302 can include user information 322. The user information 322 can include information descriptive of the user associated with the computing device 300. To do so, the user information 322 can include user preference information 323. The user preference information 323 can indicate particular preferences of the user towards the manner in which content items are displayed. For example, the user preference information 323 can indicate a preference for interface elements of the teleconference being displayed via the computing device 300. For another example, if the computing device 300 includes a certain input device, such as a touchscreen, the user preference information 323 can indicate a preference that applications be displayed via the computing device 300.

The user information 322 can include historical user information 324. The historical user information 324 can indicate feedback previously provided by the user with regards to display of content items. For example, the historical user information 324 can indicate that the user has historically preferred that the computing device 300 be utilized to display the video stream being provided by the user.

The user information 322 can include user identifying information 326. The user identifying information 326 can be information that identifies the user associated with the computing device 300. In some implementations, the user identifying information 326 can be, or otherwise include, user access credentials for a user account associated with the teleconference participation system 302. More specifically, teleconference services often require that a user register an account with the service prior to utilizing the service. During the account registration process, a user is generally provided access credentials that can be utilized to access the user account. These access credentials can also serve to uniquely identify the user. As such, the user identifying information 326 can include the access credentials so that a teleconference computing system can associate the computing device 300 with the user as described with regards to FIG. 1.

It should be noted that, in some implementations, content items can be distributed to multiple computing devices without interacting with a teleconference computing system. Rather, computing devices such as the computing device 300 can coordinate directly with other computing devices to dynamically distribute content items. Specifically, assume that the computing device 300 is detectable to another computing device already being used by the user to connect to an active teleconference session. For example, if both the computing device 300 and the other computing device are connected to a wireless network, such as a Wi-Fi network, the computing device 300 can be discoverable over the network. For another example, the computing device 300 can attempt to detect closely located devices via wireless signaling, such as Bluetooth® signaling.

To do so, the computing device 300 can include a local network signaler 330. The local network signaler 330 can detect and transmit wireless signaling over different types of wireless networks to detect other computing devices being utilized by the same user. If another computing device is detected, the content item selector 304 can coordinate with the other computing device via the local network signaler 330 to select content items for display at the computing device 300.

For example, assume that some other computing device is being used by the user to participate in the active teleconference session, and that the other computer cannot currently display a content item due to a lack of available display area. The local network signaler 330 can detect the other computing device. The other computing device can inform the computing device 300 that the other computing device has a particular content item that cannot be displayed. The content item selector 304 can indicate to the other computing device that the computing device 300 can display the content item. Then, the content item selector 304 can receive the content item from the other computing device, from a teleconference computing system, etc.

The local network signaler 330 can exchange messages with other devices. For example, the local network signaler 330 can exchange messages that include information descriptive of content item(s) currently being displayed at connected computing device and content item(s) currently not being displayed at the connected computing device. The messages can also include instructions to cause display of either of the above-mentioned types of content items.

In some implementations, the local network signaler 330 can transmit an identification request signal via local network(s). The identification request signal can request that local devices provide their identity to the local network signaler 330. In other words, the identification request signal can be utilized to discover local devices. In response to transmitting the identification request signal, the local network signaler 330 can receive identifying information that identifies the computing device that is already connected to the active teleconference session.

The teleconference participation system 302 can include device identifying information 332. The device identifying information 332 can be information that uniquely identifies the computing device 300. Device identifying information 332 can include a MAC address, hardware ID, identifier for a particular hardware component (e.g., a processor, graphics processing unit, etc.), a unique identifier generated for the computing device 300 by the teleconference participation system 302, etc.

Figure 4A:
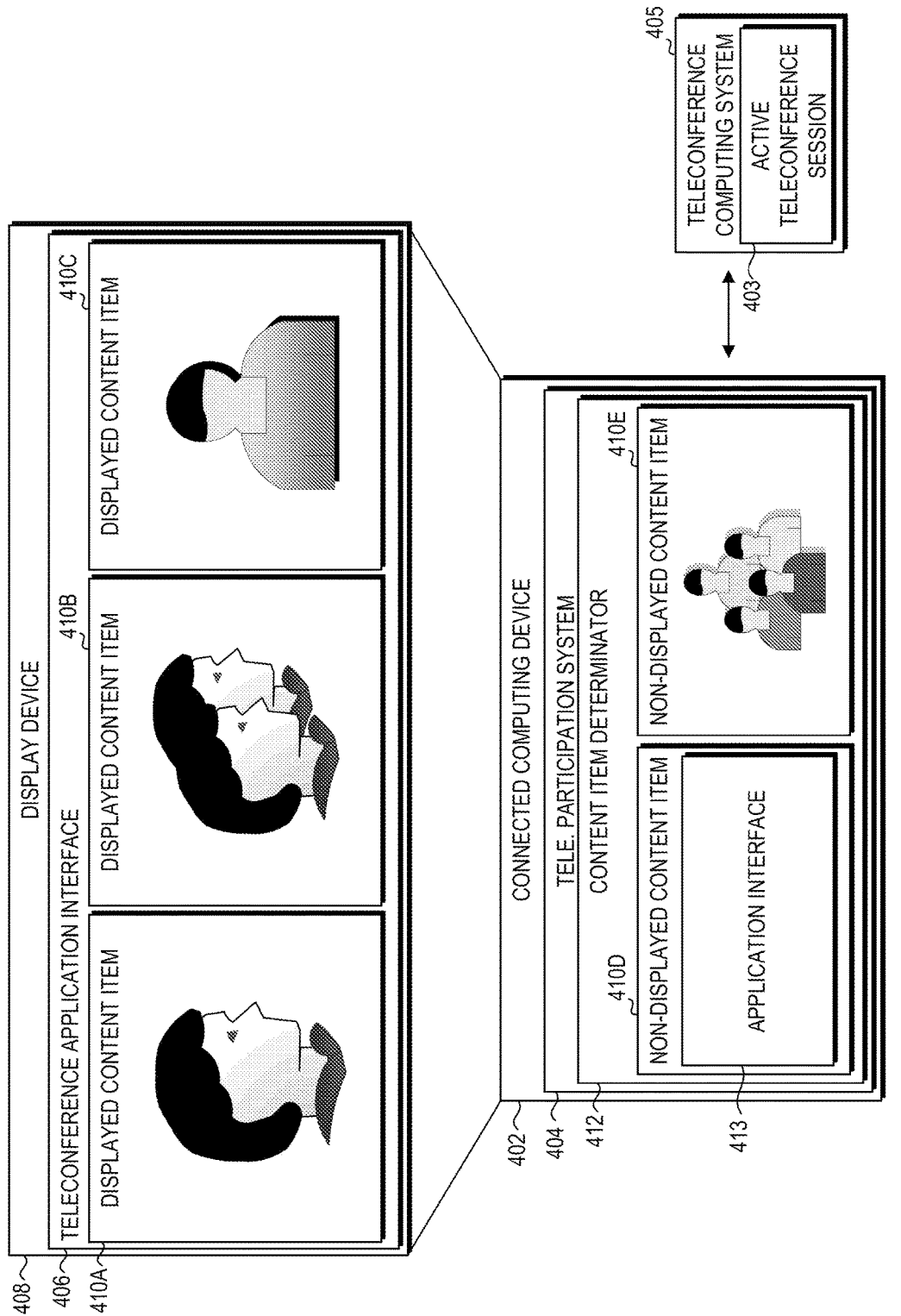
FIG. 4A illustrates an example connected computing device displaying content items received while connected to an active teleconference session according to some implementations of the present disclosure.

FIG. 4A-4D illustrate example distributions of content items for a computing device in different operating modes according to some implementations of the present disclosure. Specifically, FIG. 4A illustrates an example connected computing device 402 displaying content items received while connected to an active teleconference session 403 according to some implementations of the present disclosure. The connected computing device 402 can be the same as, or substantially similar to, the computing device 300 of FIG. 3, or the computing device 108 of FIG. 1.

As depicted, the connected computing device 402 has already connected to an active teleconference session 403 hosted by a teleconference computing system 405 using a teleconference participation system 404. While connected to the active teleconference session 403, the teleconference participation system 404 can display a teleconference application interface 406 at a display device 408 associated with the connected computing device 402. The teleconference application interface 406 can include interface elements that allow a user to control various settings or other aspects of the teleconference application, such as audio playback volume, visual fidelity (e.g., resolution), certain operating modes (e.g., low-bandwidth modes), selected input/output devices, etc.

While participating in the active teleconference session 403 hosted by the teleconference computing system 405, the connected computing device 402 can receive content items 410A-410E (generally, content items 410) for display at the display device 408 within the teleconference application interface 406. The content items 410 selected for display at the display device 408 can be selected with a content item selector 412. The content item selector 412 can select certain content items 410 for display at the display device 408 as described with regards to the content item selector 304 of FIG. 3.

In particular, the content item selector 412 can determine to select content items 410A, 410B, and 410C for display, while refraining from selecting content items 410D and 410E for display. As described with regards to FIG. 3, the content item selector 412 can select content items for display based on a variety of different parameters. For example, content items 412A, 412B, and 412C can be the video streams for three of most recent actively speaking teleconference participants, while the content item 410E can be the video stream for a participant who has not yet spoken in the active teleconference session 403. The content item 410D can be, or otherwise include, an application interface 413 (or certain elements of the interface) for an application associated with the teleconference participation system 404 or some other application. For example, the application interface 413 can be additional interfaces or interface elements of the teleconference application interface 406 that is provided to control various client-side settings or parameters of the teleconference participation system 404 (e.g., selected input/output devices, playback volume, application of AR layers, etc.). For another example, the application interface 413 can be an interface for a native application (e.g., a web browser, etc.) or an application executed in a shared execution environment (e.g., a virtualized instance of a native application, etc.).

In some implementations, the content item selector 412 can refrain from selecting the content items 410D and 410E for display at the display device 408 due to a lack of available display area at the display device 408. In other words, if the display device 408 lacks additional content item display capacity, the content item selector 412 can refrain from selecting any additional content items. Alternatively, in some implementations, the content item selector 412 can refrain from selecting additional content items based on an evaluation of the available content items, current performance metrics for the connected computing device 402, preferences of the user associated with the connected computing device 402, etc. For example, if the application interface 413 is a sub-interface of the teleconference application interface 406, the user associated with the connected computing device 402 can indicate a preference that the sub-interface not be displayed. For another example, the content item selector 412 can determine that the connected computing device 402 lacks sufficient available bandwidth to concurrently display content items 410A, 410B, 410C, and 410D. For yet another example, the content item selector 412 can make a determination to refrain from displaying content item 410E so that the available display area for each of the content items 410A-410C is larger, thus increasing the resolution of each content item 410A-410C.

Figure 4B:
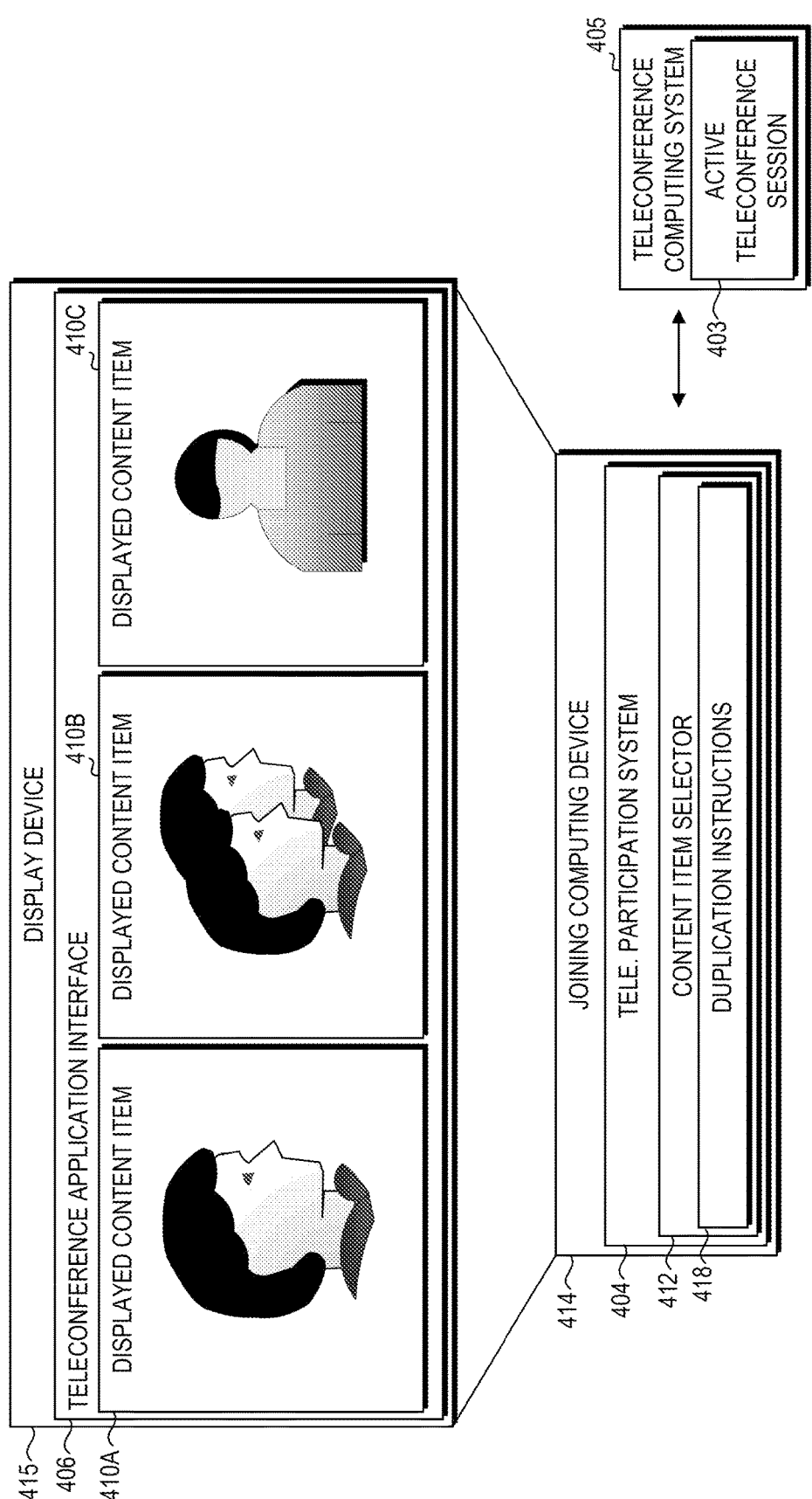
FIG. 4B illustrates an example joining computing device operating in a duplication operating mode to display content items provided to the joining computing device according to some implementations of the present disclosure.

Turning to FIG. 4B, FIG. 4B illustrates an example joining computing device 416 operating in a duplication operating mode to display content items provided to the joining computing device 416 according to some implementations of the present disclosure. In particular, the joining computing device 416 can join the active teleconference session by providing a session join request to the teleconference computing system 405. The session join request can include information that identifies the joining computing device 416 and the user associated with the connected computing device 416 as described with regards to FIG. 3.

The joining computing device 414 can be a device that facilitates teleconference participation in the same manner as the connected computing device 402. For example, the joining computing device 414 can include the same teleconference participation system 404, which can include the same content item selector 412, etc. It should be noted that the joining computing device 414 can be associated with a display device 415 that is different than the display device 408. As such, implementations of the present disclosure can increase the total display area available to the user by utilizing both the display devices 408 and 415.

The joining computing device 414 can operate in a "duplication" operating mode. As described previously, when operating in the duplication operating mode, the joining computing device 414 can display some, or all, of the content item(s) that are currently being displayed by the connected computing device 402 such that the content item(s) will be displayed concurrently at both the display device 408 and the display device 415. In other words, while operating in the duplication operating modem, the content items displayed by the joining computing device 414 can be duplicates of those displayed by the connected computing device 414.

In some implementations, the joining computing device 414 can operate in the duplication operating mode in response to receiving the duplication instructions 418. For example, once the session join request is provided to the teleconference computing system 405, the joining computing device 416 can receive duplication instructions 418. The duplication instructions 418 can instruct the joining computing device to duplicate content items displayed at the connected computing device 402. To follow the depicted example, the duplication instructions 418 can instruct the joining computing device 414 to display content items 410A, 410B, and 410C.

In some implementations, the duplication instructions 418 can be provided by the teleconference computing system 405. For example, the teleconference computing system 405 can determine it is relatively likely that the user associated with the connected computing device 414 is preparing to move away from the connected computing device 402 (e.g., to catch public transportation, etc.). Alternatively, in some implementations, the duplication instructions 418 can be received from the connected computing device 402. For example, the connected computing device 402 can determine that the user prefers a "duplication" operating mode rather than an "extension" operating mode. Alternatively, in some implementations, the joining computing device 414 can generate the duplication instructions 418. For example, the joining computing device 414 can utilize the content item selector 412 to determine to duplicate content items displayed at the connected computing device 402 as described with regards to FIG. 3.

In some implementations, the joining computing device 414 can receive the content items 410A-410C from the teleconference computing system 405. For example, if the teleconference computing system 405 directly hosts the active teleconference session 403 (e.g., serves as a broadcasting intermediary for connected computing devices), the teleconference computing system 405 can broadcast the content items 410A-410C to the joining computing device 414. Alternatively, if the teleconference computing system 405 is hosting a P2P active teleconference session 403, the joining computing device 414 can request the content items 410A-410C from computing devices that provide the content items 410A-410C (e.g., either directly to those computing devices or indirectly via the teleconference computing system 405).

Figure 4C:
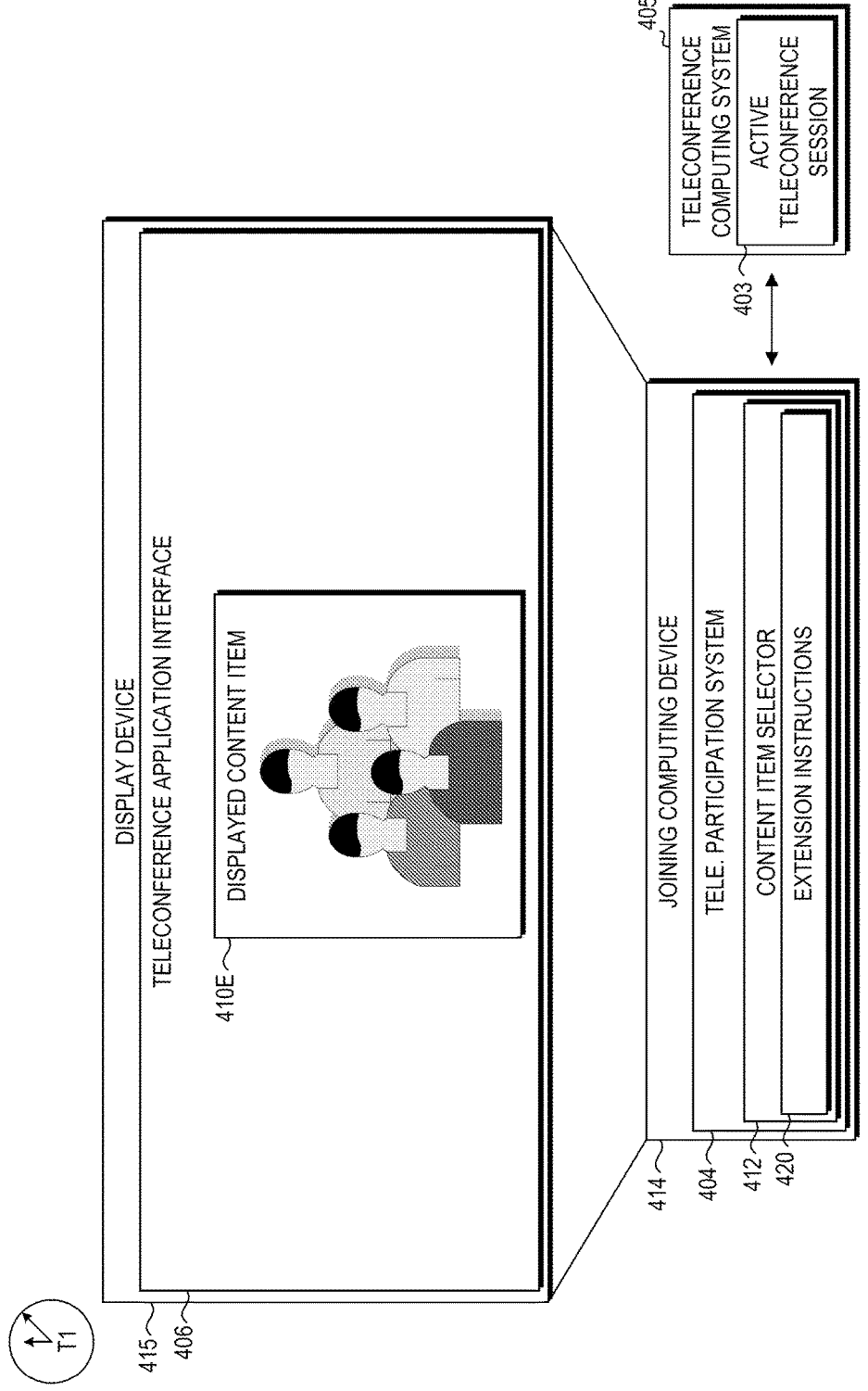
FIG. 4C illustrates the example joining computing device operating in an extension operating mode to display content items provided to the joining computing device at a time T1 according to some implementations of the present disclosure.

Turning to FIG. 4C, FIG. 4C illustrates the example joining computing device 416 operating in an extension operating mode to display content items provided to the joining computing device 416 at a time T1 according to some implementations of the present disclosure. Specifically, rather than operate in a "duplication" operating mode, as illustrated in FIG. 4B, the joining computing device 414 can operate in an "extension" operating mode. As described previously, when operating in the extension operating mode, the joining computing device 414 can display some, or all, of the content item(s) that are not being displayed at the display device 408 associated with the connected computing device 402. In other words, while operating in the duplication operating mode, the joining computing device 414 can utilize the display area of the display device 415 as an "extension" of the display area of the display device 408. Because the display device 415 can be considered an extension of the display device 408 while the joining computing device 414 operates in the extension operating mode, it is unnecessary to display duplicate content items on both display devices 408 and 415.

In some implementations, the joining computing device 414 can operate in the extension operating mode in response to receiving extension instructions 420. The extension instructions 420 can instruct the joining computing device 414 to operate in the extension operating mode, or can otherwise instruct the joining computing device 414 to display content items that are not displayed at the display device 408 associated with the connected computing device 402.

In some implementations, the extension instructions 420 can include information indicating the content items currently being displayed at the display device 408 associated with the connected computing device 402. In this manner, the content item selector 412 of the joining computing device 414 can select content items that are not being displayed at the display device 408 associated with the connected computing device 402. Additionally, or alternatively, in some implementations, the joining computing device 414 requests that the connected computing device 402 provide the information indicating the currently displayed content items.

In some implementations, the extension instructions 420 can be provided to the joining computing device 414 by the teleconference computing system 405. Alternatively, in some implementations, the extension instructions 420 can be provided to the joining computing device 414 by the connected computing device 402. Alternatively, in some implementations, the extension instructions 420 can be generated by the joining computing device 414.

As described previously, the operating mode for the joining computing device 414 can be selected by the teleconference computing system 405, the connected computing device 402, and/or the joining computing device 414. The operating mode can be selected based at least in part on current or predicted behavior of the user associated with the joining computing device 414 and the connected computing device 402. For example, if the user is predicted to continue concurrently utilizing both the joining computing device 414 and the connected computing device 402, the extension mode can be selected. For another example, if the user is predicted to stop utilizing the connected computing device 402, the duplication mode can be selected. In this manner, the user can seamlessly transition between the connected computing device 402 and the joining computing device 414 without temporarily being unable to participate in the active teleconference session 403.

Figure 4D:
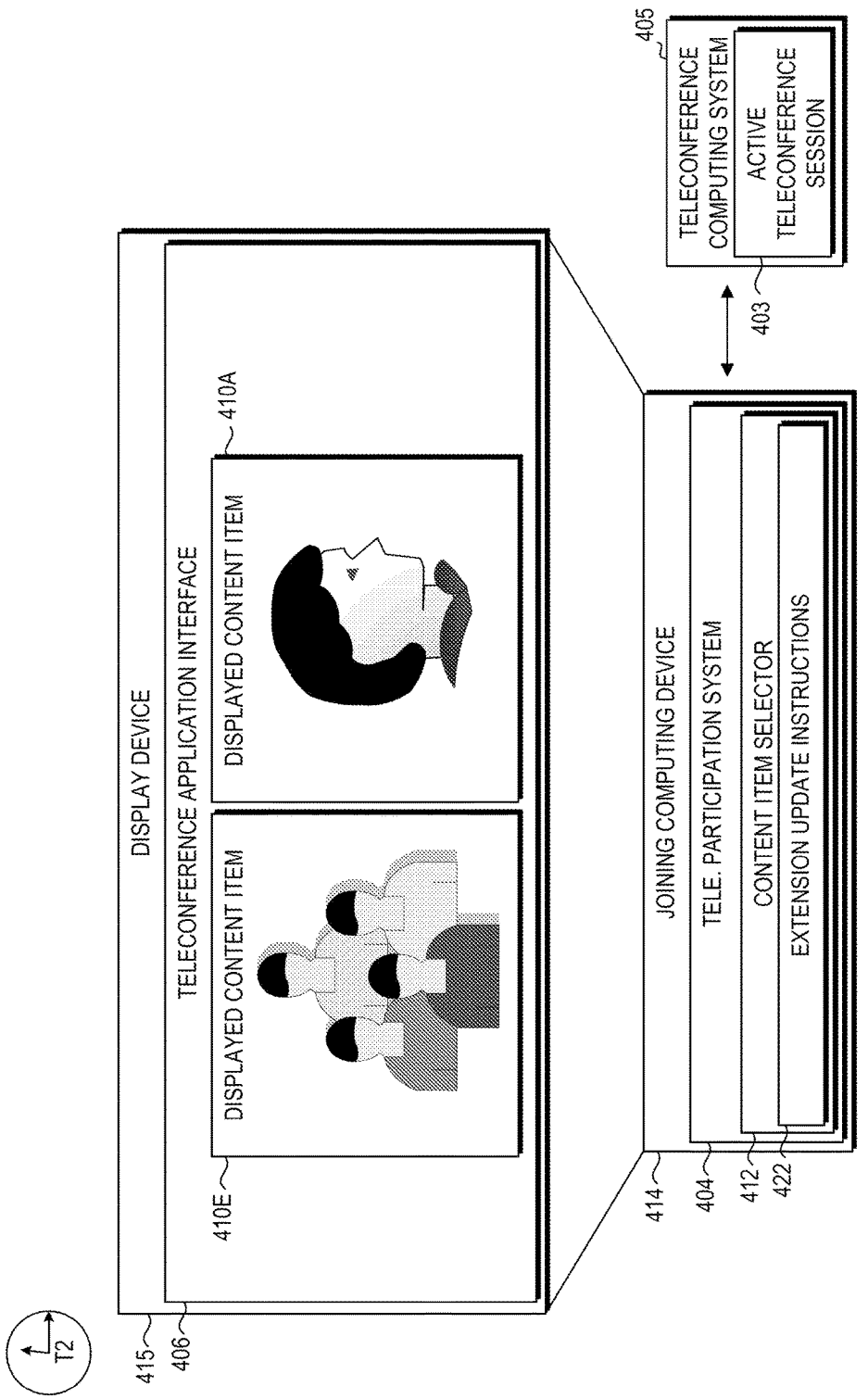
FIG. 4D illustrates the example joining computing device selecting an additional content item for display based on update instructions at a time T2 subsequent the time T1 according to some implementations of the present disclosure.

Turning to FIG. 4D, FIG. 4D illustrates the example joining computing device 416 selecting an additional content item for display based on update instructions at a time T2 subsequent the time T1 according to some implementations of the present disclosure. Specifically, at the time T1 illustrated in FIG. 4C, the joining computing device 414 can operate in the extension operating mode. While operating in the extension model, the joining computing device 414 can display the content item 410E at the display device 415 because the content item 410E is not displayed at the display device 408 at the time T1.

At a time T2 subsequent to T1, the joining computing device 414 can obtain content item selection information 422. The content item selection information 422 can describe, or otherwise indicate, information relevant to selecting content items for display at the display device 415. Content item selection information 422 can be generated if the content item(s) currently being displayed by one of the computing devices 402 and/or 414 changes. For example, if the connected computing device 402 ceases to display content item(s), or displays additional content item(s), the connected computing device 402 and/or the teleconference computing system 405 can generate the content item selection information 422 and provide them to the joining computing device 414. For another example, if the joining computing device 414 ceases to display content item(s), or displays additional content item(s), the joining computing device 414 and/or the teleconference computing system 405 can generate the content item selection information 422 and provide them to the connected computing device 402.

Additionally, in some implementations, the content items selection information 422 can include other information relevant to selecting the content items for display. Such information can include sensor information (e.g., movement sensors for a smartphone device, etc.), historical user information, user preferences, etc.

Specifically, to follow the illustrated example, the content item selection information 422 can indicate that the content item 410A is no longer being displayed at the display device 408 associated with the connected computing device 402. For example, if the user reduces an available display area of the display device 408 (e.g., by opening an additional native application, by re-sizing the application window for the teleconference application interface 406, etc.), the content item selector 412 of the connected computing device 402 can determine to cease displaying content item 410A. The content item selection information 422 can indicate that the content item 410A is no longer being displayed at the display device 408. As the joining computing device 414 is operating in the extension operating mode, the content item selector 412 of the joining computing device 414 can select the content item 410A for display at the display device 415 based on the content item selection information 422.

It should be noted that the content item selection information 422 can also be leveraged similarly when the joining computing device 414 is operating in the duplication operating mode. For example, assume that at the time T2, the joining computing device is operating in the duplication operating mode rather than the extension operating mode (not illustrated). Because the content item 410A is displayed at the display device 408 prior to the time T2, the joining computing device 414 can already be displaying the content item 410A. Based on the content item selection information 422, the joining computing device 414 can cease displaying the content item 410A.

Figure 5:
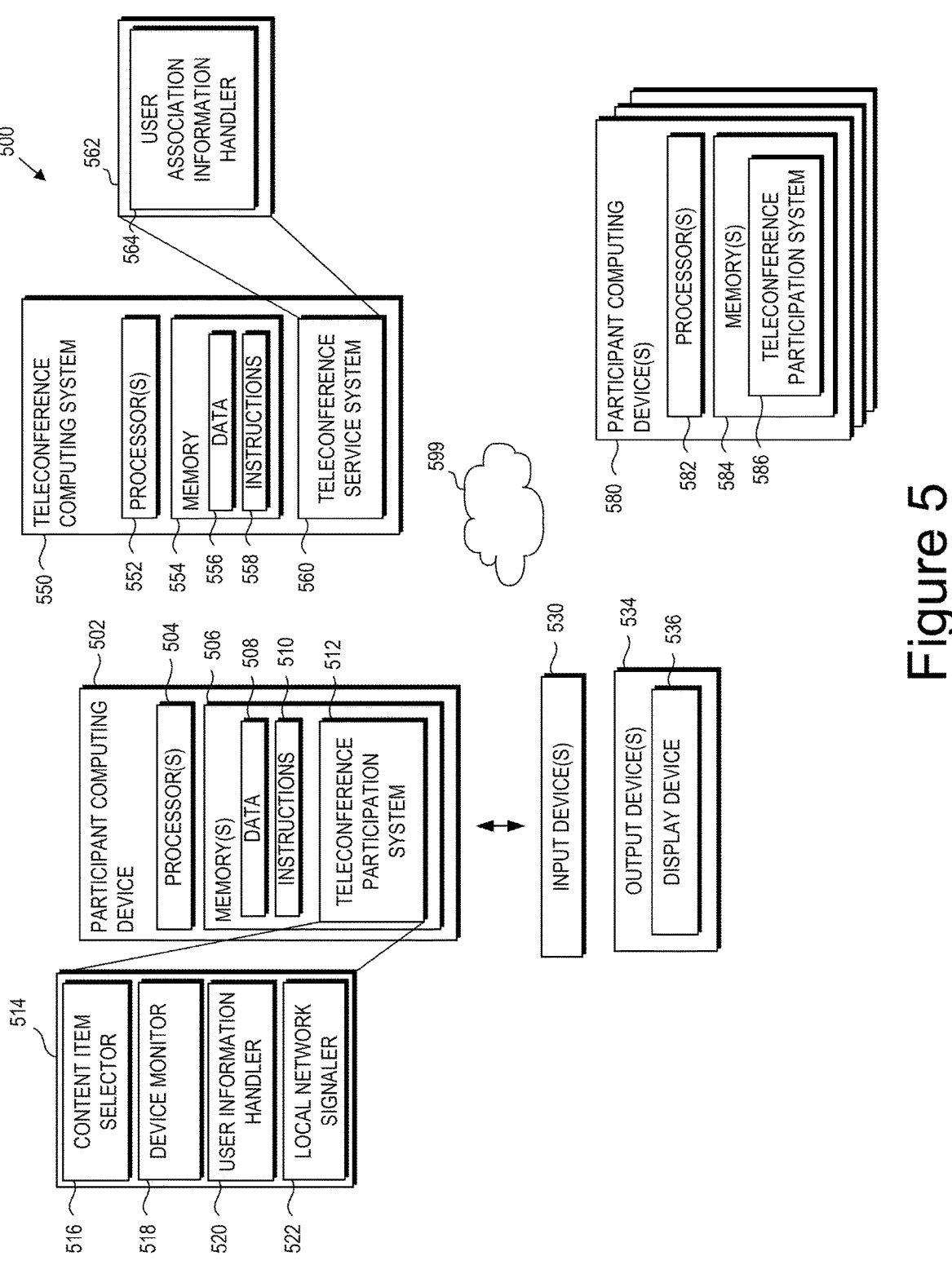
FIG. 5 is a block diagram of an example computing environment that performs various implementations of the present disclosure.

FIG. 5 is a block diagram of an example computing environment that performs various implementations of the present disclosure. In particular, the participant computing device 502 can, in some implementations, be a computing device for participating in teleconference sessions. It should be noted that a "participant computing device" merely refers to a computing device that can be utilized to participate in a teleconference, display communication information, or otherwise cause communication information to be displayed. For example, the computing devices 108 and 118 of FIG. 1, the computing device 300 of FIG. 3, and the computing devices 402 and 414 of FIGS. 4A-4D can all be, or otherwise include participant computing devices.

The participant computing device 502 includes processor(s) 504 and memory(s) 506. The processor(s) 504 can be any suitable processing device (e.g., a processor core, a microprocessor, an ASIC, an FPGA, a controller, a microcontroller, etc.) and can be one processor or processors that are operatively connected. The memory 506 can include non-transitory computer-readable storage media(s), such as RAM, ROM, EEPROM, EPROM, flash memory devices, magnetic disks, etc., and combinations thereof. The memory 506 can store data 508 and instructions 510 which are executed by the processor 504 to cause the participant computing device 502 to perform operations.

In particular, the memory 506 of the participant computing device 502 can include a teleconference participation system 512. The teleconference participation system 512 can facilitate participation in a teleconference by a participant associated with the participant computing device 502 (e.g., a teleconference hosted or otherwise orchestrated by teleconference computing system 550, etc.). To facilitate teleconference participation, the teleconference participation system 512 can include service module(s) 514 which, by providing various services, can collectively facilitate participation in a teleconference.

For example, the teleconference service module(s) 514 can include a content item selector 516. The content item selector 516 can select content items for display at a display device associated with the participant computing device 502 in the same manner as described with regards to the content item selector 304 of FIG. 3.

For another example, the teleconference service module(s) 514 can include a device monitor 518. The device monitor 518 can monitor performance metrics and related information as described with regards to the device monitor 312 of FIG. 3.

For another example, the teleconference service module(s) 514 can include a user information handler 520. The user information handler 520 can obtain, index, store, and/or otherwise manage user information. User information can include non-sensitive information related to user interactions with the teleconference participation system 512, such as user preferences, previous user selections, etc. The user information stored by the user information handler 520 can be the same as, or substantially similar to, the user information 322 of FIG. 3.

For another example, the teleconference service module(s) 514 can include a local network signaler 522. The local network signaler 522 can manage local network signaling. For example, the local network signaler 522 can signal other computing devices, such as teleconference computing system 550 participant computing device(s) 580. The local network signaler 522 can handle signaling over wireless networks 599. The local network signaler 522 can perform local network signaling as described with regards to the local network signaler 330 of FIG. 3.

The participant computing device 502 can also include input device(s) 530 that receive inputs from a participant, or otherwise capture data associated with a participant. For example, the input device(s) 530 can include a touch-sensitive device (e.g., a touch-sensitive display screen or a touch pad) that is sensitive to the touch of a participant input object (e.g., a finger or a stylus). The touch-sensitive device can serve to implement a virtual keyboard. Other example participant input components include a microphone, a traditional keyboard, or other means by which a participant can provide user input.

In some implementations, the participant computing device 502 can include, or can be communicatively coupled to, input device(s) 530. For example, the input device(s) 530 can include a camera device that can capture two-dimensional video data of a participant associated with the participant computing device 502 (e.g., for broadcasting, etc.). In some implementations, the input device(s) 530 can include a number of camera devices communicatively coupled to the participant computing device 502 that are configured to capture image data from different perspectives for generation of three-dimensional pose data/representations (e.g., a representation of a user of the participant computing device 502, etc.).

In some implementations, the input device(s) 530 can include sensor devices configured to capture sensor data indicative of movements of a participant associated with the teleconference computing system 502 (e.g., accelerometer(s), Global Positioning Satellite (GPS) sensor(s), gyroscope(s), infrared sensor(s), head tracking sensor(s) such as magnetic capture system(s), an omni-directional treadmill device, sensor(s) configured to track eye movements of the user, etc.).

In some implementations, the participant computing device 502 can include, or be communicatively coupled to, output device(s) 534. Output device(s) 534 can be, or otherwise include, device(s) configured to output audio data, image data, video data, etc. For example, the output device(s) 534 can include a two-dimensional display device (e.g., a television, projector, smartphone display device, etc.). For another example, the output device(s) 534 can include display devices for an augmented reality device or virtual reality device.

In particular, the output device(s) 534 can include a display device 536. In some implementations, the display device 536 can be a device built-in to the participant computing device 502, such as the touchscreen device of a smartphone or tablet, the display of a laptop device, etc. Alternatively, in some implementations, the display device 536 can be communicatively coupled to the participant computing device 502. As described herein, "communicatively coupled" can refer to a wired or wireless connection between the participant computing device 502 and the display device 536 that enables the participant computing device 502 to output communication data, such as video or audio data, using the and the display device 536. For example, the participant computing device 502 can be connected to the display device 536 using a conventional wired display interface, such as a High-Definition Multimedia Interface (HDMI). The participant computing device 502 can receive video and audio data from the teleconference computing system. The participant computing device 502 can cause the video and audio data to be output at the display device 536 by transmitting the video and audio data to the display device 536 via the HDMI.

The teleconference computing system 550 includes processor(s) 552 and a memory 554. The processor(s) 552 can be any suitable processing device (e.g., a processor core, a microprocessor, an ASIC, an FPGA, a controller, a microcontroller, etc.) and can be one processor or processors that are operatively connected. The memory 554 can include non-transitory computer-readable storage media(s), such as RAM, ROM, EEPROM, EPROM, flash memory devices, magnetic disks, etc., and combinations thereof. The memory 554 can store data 556 and instructions 558 which are executed by the processor 552 to cause the teleconference computing system 550 to perform operations.

In some implementations, the teleconference computing system 550 can be, or otherwise include, a virtual machine or containerized unit of software instructions executed within a virtualized cloud computing environment (e.g., a distributed, networked collection of processing devices), and can be instantiated on request (e.g., in response to a request to initiate a teleconference, etc.). Additionally, or alternatively, in some implementations, the teleconference computing system 550 can be, or otherwise include, physical processing devices, such as processing nodes within a cloud computing network (e.g., nodes of physical hardware resources).

The teleconference computing system 550 can facilitate the exchange of communication data within a teleconference using the teleconference service system 560. More specifically, the teleconference computing system 550 can utilize the teleconference service system 560 to encode, broadcast, and/or relay communications signals (e.g., audio input signals, video input signals, etc.), host chat rooms, relay teleconference invites, provide web applications for participation in a teleconference (e.g., a web application accessible via a web browser at a teleconference computing system, etc.), etc.

More generally, the teleconference computing system 550 can utilize the teleconference service system 560 to handle any frontend or backend services directed to providing a teleconference. For example, the teleconference service system 560 can receive and broadcast (i.e., relay) data (e.g., video data, audio data, etc.) between the participant computing device 502 and participant computing device(s) 580. For another example, the teleconference service system 560 can facilitate direct communications between the participant computing device 502 and participant computing device(s) 580 (e.g., peer-to-peer communications, etc.). A teleconferencing service can be any type of application or service that receives and broadcasts data from multiple participants. For example, in some implementations, the teleconferencing service can be a videoconferencing service that receives data (e.g., audio data, video data, both audio and video data, etc.) from some participants and broadcasts the data to other participants.

As an example, the teleconference service system 560 can provide a videoconference service for multiple participants. One of the participants can transmit audio and video data to the teleconference service system 560 using a participant device (e.g., participant computing device 502, etc.). A different participant can transmit audio data to the teleconference service system 560 with a different participant computing device. The teleconference service system 560 can receive the data from the participants and broadcast the data to each computing system.

As another example, the teleconference service system 560 can implement an augmented reality (AR) or virtual reality (VR) conferencing service for multiple participants. One of the participants can transmit AR/VR data sufficient to generate a three-dimensional representation of the participant to the teleconference service system 560 via a device (e.g., video data, audio data, sensor data indicative of a pose and/or movement of a participant, etc.). The teleconference service system 560 can transmit the AR/VR data to devices of the other participants. In such fashion, the teleconference service system 560 can facilitate any type or manner of teleconferencing services to multiple participants.

It should be noted that the teleconference service system 560 can facilitate the flow of data between participants (e.g., participant computing device 502, participant computing device(s) 580, etc.) in any manner that is sufficient to implement the teleconference service. In some implementations, the teleconference service system 560 can be configured to receive data from participants, decode the data, encode the data, broadcast the data to other participants, etc. For example, the teleconference service system 560 can receive encoded video data from the participant computing device 502. The teleconference service system 560 can decode the video data according to a video codec utilized by the participant computing device 502. The teleconference service system 560 can encode the video data with a video codec and broadcast the data to participant computing devices.

In particular, to facilitate teleconference participation, the teleconference service system 560 can include hosting module(s) 562 which fulfill or orchestrate various teleconferencing services that collectively provide a teleconference for participants. The hosting module(s) 562 can implement some of the functionality described with regards to the teleconference service modules 514 of the teleconference participation system 514. Specifically, in some implementations, the hosting module(s) 562 can implement some (or all) of the functionality provided by the content item selector 516. For example, the hosting module(s) 562 can select content item(s) based on a determined operating mode for the participant computing device 502 and can indicate the selected content item(s) to the participant computing device 502.

Additionally, or alternatively, in some implementations, the hosting module(s) 562 can implement some (or all) of the functionality provided by the user information handler 520. For example, the hosting module(s) 562 can obtain, index, store, and/or otherwise manage user information for the user associated with the participant computing device 502.

Additionally, or alternatively, in some implementations, the hosting module(s) 562 can include user association information handler 564. The user association information handler 564 can store, create, delete, modify, and otherwise manage user association information. The user association information can store associations between computing devices and users as described with regards to the user association information 111 of FIG. 1.

In some implementations, the teleconference computing system 550 includes, or is otherwise implemented by, server computing device(s). In instances in which the teleconference computing system 550 includes multiple server computing devices, such server computing devices can operate according to sequential computing architectures, parallel computing architectures, or some combination thereof.

In some implementations, the transmission and reception of data by teleconference computing system 550 can be accomplished via the network 599. For example, in some implementations, the participant computing device 502 can capture video data, audio data, multimedia data (e.g., video data and audio data, etc.), sensor data, etc. and transmit the data to the teleconference computing system 550. The teleconference computing system 550 can receive the data via the network 599.

In some implementations, the teleconference computing system 550 can receive data from the participant computing device(s) 502 and 580 according to various encryption scheme(s) (e.g., codec(s), lossy compression scheme(s), lossless compression scheme(s), etc.). For example, the participant computing device 502 can encode audio data with an audio codec, and then transmit the encoded audio data to the teleconference computing system 550. The teleconference computing system 550 can decode the encoded audio data with the audio codec. In some implementations, the participant computing device 502 can dynamically select between a number of different codecs with varying degrees of loss based on conditions (e.g., available network bandwidth, accessibility of hardware/software resources, etc.) of the network 599, the participant computing device 502, and/or the teleconference computing system 550. For example, the participant computing device 502 can dynamically switch from audio data transmission according to a lossy encoding scheme to audio data transmission according to a lossless encoding scheme based on a signal strength between the participant computing device 502 and the network 599.

The teleconference computing system 550 and the participant computing device 502 can communicate with the participant computing device(s) 580 via the network 599. The participant computing device(s) 580 can be any type of computing device(s), such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), or any other type of computing device.

The participant computing device(s) 580 includes processor(s) 582 and a memory 584 as described with regards to the participant computing device 502. Specifically, the participant computing device(s) 580 can be the same, or similar, device(s) as the participant computing device 502. For example, the participant computing device(s) 580 can each include a teleconference participation system 586 that includes at least some of the modules 514 of the teleconference participation system 512. For another example, the participant computing device(s) 580 may include, or may be communicatively coupled to, the same type of input and output devices as described with regards to input device(s) 530 and output device(s) 534 (e.g., device(s) 536, etc.). Alternatively, in some implementations, the participant computing device(s) 580 can be different devices than the participant computing device 502, but can also facilitate teleconferencing with the teleconference computing system 550. For example, the participant computing device 502 can be a laptop and the participant computing device(s) 580 can be smartphone(s).

The network 599 can be any type of communications network, such as a local area network (e.g., intranet), wide area network (e.g., Internet), or some combination thereof and can include any number of wired or wireless links. In general, communication over the network 599 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

The following definitions provide a detailed description of various terms discussed throughout the subject specification. As such, it should be noted that any previous reference in the specification to the following terms should be understood in light of these definitions.

Broadcast: as used herein, the terms "broadcast" or "broadcasting" generally refers to any transmission of data (e.g., audio data, video data, AR/VR data, etc.) from a central entity (e.g., computing device, computing system, etc.) for potential receipt by one or more other entities or devices. A broadcast of data can be performed to orchestrate or otherwise facilitate a teleconference that includes a number of participants. For example, a central entity, such as a teleconference server system, can receive an audio transmission from a participant computing device associated with one participant and broadcast the audio transmission to a number of participant computing devices associated with other participants of a teleconference session. For another example, a central entity can detect that direct peer-to-peer data transmission between two participants in a private teleconference is not possible (e.g., due to firewall settings, etc.) and can serve as a relay intermediary that receives and broadcasts data transmissions between participant computing devices associated with the participants. In some implementations, broadcast or broadcasting can include the encoding and/or decoding of transmitted and/or received data. For example, a teleconference computing system broadcasting video data can encode the video data using a codec. Participant computing devices receiving the broadcast can decode the video using the codec.

In some implementations, a broadcast can be, or otherwise include, wireless signaling that carries data, such as communications data, received in a transmission from a participant computing device. Additionally, or alternatively, in some instances, a broadcast can carry data obtained from a data store, storage device, content provider, application programming interface (API), etc. For example, a central entity can receive transmissions of audio data from a number of participant computing devices. The central entity can broadcast the audio data alongside video data obtained from a video data repository. As such, the broadcast of data is not limited to data received via transmissions from participant computing devices within the context of a teleconference.

Communications data: as used herein, the term "communications data" generally refers to any type or manner of data that carries a communication, or otherwise facilitates communication between participants of a teleconference. Communications data can include audio data, video data, textual data, augmented reality/virtual reality (AR/VR) data, etc. As an example, communications data can collectively refer to audio data and video data transmitted within the context of a videoconference. As another example, within the context of an AR/VR conference, communications data can collectively refer to audio data and AR/VR data, such as positioning data, pose data, facial capture data, etc. that is utilized to generate a representation of the participant within a virtual environment. As yet another example, communications data can refer to textual content provided by participants (e.g., via a chat function of the teleconference, via transcription of audio transmissions using text-to-speech technologies, etc.).

Cloud: as used herein, the term "cloud" or "cloud computing environment" generally refers to a network of interconnected computing devices (e.g., physical computing devices, virtualized computing devices, etc.) and associated storage media which interoperate to perform computational operations such as data storage, transfer, and/or processing. In some implementations, a cloud computing environment can be implemented and managed by an information technology (IT) service provider. The IT service provider can provide access to the cloud computing environment as a service to various users, who can in some circumstances be referred to as "cloud customers."

Participant: as used herein, the term "participant" generally refers to any user (e.g., human user), virtualized user (e.g., a bot, etc.), or group of users that participate in a live exchange of data (e.g., a teleconference such as a videoconference, etc.). More specifically, participant can be used throughout the subject specification to refer to user(s) within the context of a teleconference. As an example, a group of participants can refer to a group of users that participate remotely in a teleconference with their own participant computing devices (e.g., smartphones, laptops, wearable devices, teleconferencing devices, broadcasting devices, etc.). As another example, a participant can refer to a group of users utilizing a single participant computing device for participation in a teleconference (e.g., a videoconferencing device within a meeting room, etc.). As yet another example, participant can refer to a bot or an automated user (e.g., a virtual assistant, etc.) that participates in a teleconference to provide various services or features for other participants in the teleconference (e.g., recording data from the teleconference, providing virtual assistant services, providing testing services, etc.)

Teleconferencing roles: As used herein, the terms "dominant", "dominant role", or "dominant speaker" generally refer to a role assigned to a participant in a teleconference that is currently, has recently, and/or is predicted to provide communications data. Similarly, the terms "non-dominant", "non-dominant role", or "non-dominant speaker" generally refer to a role assigned to a participant in a teleconference that is currently not providing communications data. For example, if one participant of a number of participants is currently speaking in a videoconference, a dominant role can be assigned to the speaking participant, and non-dominant roles can be assigned to the other participants. For another example, if one participant currently speaking and currently assigned a dominant role is predicted to stop speaking soon, the participant can be assigned a non-dominant role. For yet another example, if one participant is gesticulating or otherwise moving within captured video data or AR/VR data in a videoconference/AR/VR conference, and other participants are relatively still, the participant who is moving can be assigned a dominant role and the other participants can be assigned a non-dominant role. As such, in some implementations, communications data can be analyzed to assign dominant and non-dominant roles to participants of a teleconference.

In some implementations, dominant and/or non-dominant roles can affect the operations of a teleconference. For example, in a videoconference, the video data associated with a participant in a dominant role can be visually featured relatively more prominently within a primary display tile of the teleconference interface, while non-dominant participants can be visually featured relatively less prominently in smaller display tiles. For another example, in an audioconference, the volume of audio data associated with non-dominant participants can be adjusted to be relatively quieter than audio data associated with a dominant participant.

Teleconference: as used herein, the term "teleconference" generally refers to any communication or live exchange of data (e.g., audio data, video data, AR/VR data, etc.) between multiple participant computing devices. The term "teleconference" encompasses a videoconference, an audioconference, a media conference, an Augmented Reality (AR)/Virtual Reality (VR) conference, and/or other forms of the exchange of data (e.g., communications data) between participant computing devices. As an example, a teleconference can refer to a videoconference in which multiple participant computing devices broadcast and/or receive video data and/or audio data in real-time or near real-time. As another example, a teleconference can refer to an AR/VR conferencing service in which AR/VR data (e.g., pose data, image data, positioning data, audio data, etc.) sufficient to generate a three-dimensional representation of a participant is exchanged amongst participant computing devices in real-time. As yet another example, a teleconference can refer to a conference in which audio signals are exchanged amongst participant computing devices over a mobile network. As yet another example, a teleconference can refer to a media conference in which one or more different types or combinations of media or other data are exchanged amongst participant computing devices (e.g., audio data, video data, AR/VR data, a combination of audio and video data, etc.).

Transmission: As used herein, the term "transmission" generally refers to any sending, providing, etc. of data (e.g., communications data) from one entity to another entity. For example, a participant computing device can directly transmit audio data to another participant computing device. For another example, a participant computing device can transmit video data to a central entity orchestrating a teleconference, and the central entity can broadcast the audio data to other entities participating in the teleconference. Transmission of data can occur over any number of wired and/or wireless communications links or devices. Data can be transmitted in various forms and/or according to various protocols. For example, data can be encrypted and/or encoded prior to transmission and decrypted and/or decoded upon receipt.

Transmission quality: As used herein, the term "transmission quality" generally refers to a perceivable quality of a transmission of communications data. In particular, transmission quality can refer to, or otherwise account for a technical quality of the transmission, such as degree of loss associated with the transmission, a resolution, a bitrate, etc. Additionally, or alternatively, the term transmission can refer to a semantic quality of the transmission, such as a degree of background noise, a clarity associated with spoken utterances of participants, etc. As such, it should be broadly understood that the "transmission quality" of a transmission can be determined in accordance with a variety of factors.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, comprising:
providing, by a first computing device comprising one or more processor devices, a session join request indicative of a request to join an active teleconference session to a teleconference computing system that hosts the active teleconference session, wherein the session join request comprises information that identifies a first participant associated with the first computing device;
responsive to providing the session join request to join the active teleconference session, receiving, by the first computing device from the teleconference computing system, interface display information comprising:
information indicating that a second computing device associated with the first participant is already connected to the active teleconference session; and
instructions to display a first content item of a plurality of content items, wherein the plurality of content items comprises one or more content items currently being displayed by the second computing device, the one or more content items comprising the first content item; and
causing, by the first computing device, display of the first content item within an interface associated with the active teleconference session at the first computing device.

2. The computer-implemented method of claim 1, wherein receiving the interface display information comprises:
receiving, by the first computing device from the teleconference computing system, the instructions to display the first content item of the plurality of content items, wherein the plurality of content items comprises
the one or more content items currently being displayed by the second computing device, wherein the one or more content items comprises a first video stream associated with a second participant; and one or more of:
a second video stream associated with a third participant that is not currently being displayed by the second computing device;
a screen-share stream associated with a third computing device;
an interface of a teleconferencing application associated with the active teleconference session; or
an interface of an application other than the teleconferencing application.

3. The computer-implemented method of claim 2, wherein receiving the interface display information comprises receiving, by the first computing device from the teleconference computing system, instructions to display a first subset of content items of the plurality of content items, wherein the first subset of content items comprises a plurality of video streams being displayed at the second computing device.

4. The computer-implemented method of claim 3, wherein causing the display of the first content item comprises:
determining, by the first computing device, a content item display capacity based on a display area available to the interface associated with the active teleconference session;
based at least in part on the content item display capacity, selecting, by the first computing device, one or more video streams of the plurality of video streams being displayed at the second computing device; and causing, by the first computing device, display of the one or more video streams of the plurality of video streams being displayed at the second computing device within the interface associated with the active teleconference session.

5. The computer-implemented method of claim 4, wherein the method further comprises:

detecting, by the first computing device, a reduction to the content item display capacity based on a change in the display area available to the interface associated with the active teleconference session; and based on the change in the content item display capacity, causing, by the first computing device, display of the one or more video streams within the interface associated with the active teleconference session to cease.

6. The computer-implemented method of claim 3, wherein the method further comprises:

receiving, by the first computing device, information indicating that an additional video stream is being displayed at the second computing device; and causing, by the first computing device, display of the additional video stream within the interface associated with the active teleconference session.

7. The computer-implemented method of claim 1, wherein providing the session join request to join the active teleconference session to the teleconference computing system comprises:

providing, by the first computing device to the teleconference computing system, content selection information descriptive of:

a current state of the first computing device; or content selection preferences for the first participant associated with the first computing device.

8. The computer-implemented method of claim 7, wherein the providing the content selection information comprises:

providing, by the first computing device to the teleconference computing system, the content selection information descriptive of the current state of the first computing device, wherein the content selection information comprises at least one of:

device identifying information that identifies characteristics of the first computing device;

display information descriptive of a display device associated with the first computing device;

a current location of the first computing device; or a bandwidth capacity of the first computing device.

9. The computer-implemented method of claim 1, wherein the information that identifies the first participant associated with the first computing device comprises access credentials associated with the first participant, wherein the access credentials are used to access the active teleconference session.

10. A computing system, comprising:

one or more processor devices;

one or more tangible, non-transitory computer-readable media that store instructions that, when executed by the one or more processor devices, cause the one or more processor devices to perform operations, the operations comprising:

receiving, from a first computing device, a session join request indicative of a request to join an active teleconference session hosted by the computing system;

making a determination that the first computing device and a second computing device that is currently connected to the active teleconference session are both associated with a first participant of the active teleconference session; and based on the determination, providing interface display information to the first computing device, wherein the interface display information comprises instructions to display a first candidate content item of a plurality of candidate content items, wherein the plurality of candidate content items comprise one or more content items being displayed at the second computing device, the one or more content items comprising the first candidate content item.

11. The computing system of claim 10, wherein the providing the interface display information comprises:

providing the interface display information to the first computing device, wherein the interface display information comprises instructions to display the first candidate content item of the one or more content items that are being displayed at the second computing device.

12. The computing system of claim 10, wherein the providing the interface display information further comprises:

providing the interface display information to the first computing device, wherein the interface display information comprises instructions to display at least one content item that is not being displayed at the second computing device.

13. A first computing device, comprising:

one or more processor devices;

one or more tangible, non-transitory computer-readable media that store instructions that, when executed by the one or more processor devices, cause the one or more processor devices to perform operations, the operations comprising:

providing a session join request indicative of a request to join an active teleconference session to a teleconference computing system that hosts the active teleconference session, wherein the session join request comprises information that identifies a first participant associated with the first computing device;

responsive to providing the session join request to join the active teleconference session, making a determination that a second computing device that is currently connected to the active teleconference session is also associated with the first participant;

based on the determination, exchanging messages with the second computing device, wherein the messages comprise information descriptive of one or more first content items currently being displayed at the second computing device and one or more second content items currently not being displayed at the second computing device; and based on the messages, causing, at the first computing device, display of at least one of the one or more first content items being displayed at the second computing device.

14. The first computing device of claim 13, wherein the at least one first content item comprises one or more of:

a video stream associated with a second participant;

a screen-share stream associated with a third computing device;

an interface of a teleconferencing application associated with the active teleconference session; or an interface of an application other than the teleconferencing application receiving, by the first computing device from the teleconference computing system.

15. The first computing device of claim 13, wherein making the determination that the second computing device that is currently connected to the active teleconference session is also associated with the first participant comprises:

receiving information from the teleconference computing system indicating that the second computing device that is currently connected to the active teleconference session is also associated with the first participant.

16. The first computing device of claim 13, wherein exchanging the messages with the second computing device comprises:

receiving, from the second computing device, instructions to cause display of the at least one of the one or more first content items.

17. The first computing device of claim 13, wherein exchanging the messages with the second computing device comprises:

providing, to the second computing device, a request to provide the information descriptive of the one or more first content items currently being displayed at the second computing device and the one or more second content items currently not being displayed at the second computing device.

18. The first computing device of claim 13, wherein exchanging the messages with the second computing device comprises:

transmitting an identification request signal via one or more local networks; and responsive to transmitting the identification request signal, receiving, from the second computing device via the one or more local networks, identifying information that identifies the second computing device.

* * * * *